United States Patent
Seok

(10) Patent No.: US 10,027,512 B2
(45) Date of Patent: Jul. 17, 2018

(54) METHOD AND APPARATUS FOR SOUNDING IN WIRELESS COMMUNICATION SYSTEM

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 15/110,090

(22) PCT Filed: Jun. 19, 2014

(86) PCT No.: PCT/KR2014/005405
§ 371 (c)(1),
(2) Date: Jul. 6, 2016

(87) PCT Pub. No.: WO2015/102180
PCT Pub. Date: Jul. 9, 2015

(65) Prior Publication Data
US 2016/0330047 A1    Nov. 10, 2016

Related U.S. Application Data

(60) Provisional application No. 61/924,176, filed on Jan. 6, 2014, provisional application No. 61/936,278, filed on Feb. 5, 2014.

(51) Int. Cl.
*H04L 25/02* (2006.01)
*H04L 27/26* (2006.01)
(Continued)

(52) U.S. Cl.
CPC ......... *H04L 25/0202* (2013.01); *H04B 7/063* (2013.01); *H04B 7/0617* (2013.01);
(Continued)

(58) Field of Classification Search
CPC ............. H04L 25/0202; H04L 25/0224; H04L 25/0228; H04L 25/0232; H04L 25/0218;
(Continued)

(56) References Cited

U.S. PATENT DOCUMENTS 8,428,530 B1 * 4/2013 Nabar ................. H04W 72/085
370/338
8,873,525 B2 * 10/2014 Liu .................... H04L 25/03343
370/338
(Continued)

FOREIGN PATENT DOCUMENTS

WO    2013077652 A1    5/2013

*Primary Examiner* — Warner Wong
(74) *Attorney, Agent, or Firm* — Lee Hong Degerman Kang & Waimey

(57) ABSTRACT

Disclosed are a method and an apparatus for sounding in a wireless communication system. A method for sounding in a wireless local area network (WLAN) may comprise: a step of receiving, by an STA, an NDPA frame from an AP; a step of receiving, by the STA, an NDP frame on the basis of identification information included in the NDPA frame; and a step of transmitting, by the STA, channel state information determined on the basis of the NDP frame to the AP, wherein the NDPA frame may be demodulated on the basis of a first FFT and the NDP frame may be demodulated on the basis of a second FFT.

10 Claims, 14 Drawing Sheets

(51) Int. Cl.
  *H04B 7/06* (2006.01)
  *H04L 27/36* (2006.01)
  *H04L 5/00* (2006.01)
  *H04W 84/12* (2009.01)
  *H04W 88/08* (2009.01)

(52) U.S. Cl.
  CPC ......... *H04B 7/0626* (2013.01); *H04B 7/0634* (2013.01); *H04L 5/0048* (2013.01); *H04L 5/0057* (2013.01); *H04L 5/0092* (2013.01); *H04L 27/261* (2013.01); *H04L 27/2602* (2013.01); *H04L 27/265* (2013.01); *H04L 27/36* (2013.01); *H04L 5/0007* (2013.01); *H04L 25/0224* (2013.01); *H04W 84/12* (2013.01); *H04W 88/08* (2013.01)

(58) Field of Classification Search
  CPC ..... H04L 5/0007; H04L 27/265; H04L 27/36; H04L 27/38; H04L 27/00; H04L 27/2628; H04L 27/06; H04L 27/14; H04L 27/22; H04L 27/144; H04L 27/2647; H04L 27/2649; H04L 1/0693; H04B 7/063; H04B 7/0626
  See application file for complete search history.

(56) References Cited

U.S. PATENT DOCUMENTS

| | | | |
|---|---|---|---|
| 8,885,512 B2* | 11/2014 | Trainin | H04W 24/10 370/252 |
| 8,885,620 B2* | 11/2014 | Liu | H04L 25/03343 370/338 |
| 8,942,214 B2* | 1/2015 | Lee | H04B 7/0636 370/338 |
| 9,172,451 B2* | 10/2015 | Trainin | H04W 24/10 |
| 9,820,302 B2* | 11/2017 | Choi | H04W 74/04 |
| 2010/0248635 A1* | 9/2010 | Zhang | H04B 7/0413 455/63.1 |
| 2011/0075607 A1* | 3/2011 | Kim | H04B 7/0417 370/328 |
| 2011/0199946 A1* | 8/2011 | Breit | H04B 7/0626 370/310 |
| 2011/0205968 A1* | 8/2011 | Kim | H04W 72/085 370/328 |
| 2011/0222473 A1* | 9/2011 | Breit | H04L 1/0026 370/328 |
| 2011/0299480 A1* | 12/2011 | Breit | H04B 7/0626 370/329 |
| 2012/0033614 A1 | 2/2012 | Sampath et al. | |
| 2012/0076179 A1* | 3/2012 | Stacey | H04W 74/06 375/219 |
| 2012/0177018 A1* | 7/2012 | Abraham | H04L 1/0027 370/338 |
| 2012/0250543 A1* | 10/2012 | Abraham | H04B 7/0626 370/252 |
| 2012/0250619 A1* | 10/2012 | Twitchell, Jr. | H04W 40/12 370/328 |
| 2012/0257567 A1* | 10/2012 | Abraham | H04B 7/0626 370/328 |
| 2012/0257605 A1* | 10/2012 | Abraham | H04B 7/0626 370/338 |
| 2012/0263126 A1* | 10/2012 | Choi | H04B 7/0617 370/329 |
| 2012/0300874 A1* | 11/2012 | Zhang | H04L 5/0048 375/295 |
| 2013/0058239 A1* | 3/2013 | Wang | H04B 7/0417 370/252 |
| 2013/0094488 A1* | 4/2013 | Choi | H04W 16/28 370/338 |
| 2013/0223427 A1 | 8/2013 | Sohn et al. | |
| 2014/0003384 A1* | 1/2014 | Zhang | H04B 7/0413 370/329 |
| 2014/0056205 A1* | 2/2014 | Aboul-Magd | H04W 72/0426 370/312 |
| 2014/0071955 A1* | 3/2014 | Du | H04B 7/0452 370/336 |
| 2014/0079010 A1* | 3/2014 | Li | H04B 7/0617 370/329 |
| 2014/0080420 A1* | 3/2014 | Yang | H04L 51/043 455/63.4 |
| 2014/0092819 A1* | 4/2014 | Du | H04B 7/0452 370/329 |
| 2014/0126405 A1* | 5/2014 | Han | H04L 5/0057 370/252 |
| 2014/0146751 A1* | 5/2014 | Jiang | H04L 1/0027 370/328 |
| 2014/0301219 A1* | 10/2014 | Ben-Haim | G01S 5/14 370/252 |
| 2014/0307817 A1* | 10/2014 | Kwon | H04B 7/0452 375/267 |
| 2014/0369302 A1* | 12/2014 | Abraham | H04B 7/0626 370/329 |
| 2015/0030094 A1* | 1/2015 | Zhang | H04B 7/0456 375/267 |
| 2015/0110046 A1* | 4/2015 | Merlin | H04B 7/0452 370/329 |
| 2015/0295629 A1* | 10/2015 | Xia | H04B 7/0491 370/329 |
| 2015/0333812 A1* | 11/2015 | Breit | H04B 7/0626 370/329 |
| 2015/0372795 A1* | 12/2015 | Wu | H04L 5/0057 370/329 |
| 2016/0278081 A1* | 9/2016 | Chun | H04W 74/08 |
| 2017/0257153 A1* | 9/2017 | Xia | H04B 7/0617 |

* cited by examiner

METHOD AND APPARATUS FOR SOUNDING IN WIRELESS COMMUNICATION SYSTEM

CROSS-REFERENCE TO RELATED APPLICATIONS

This application is the National Stage filing under 35 U.S.C. 371 of International Application No. PCT/KR2014/005405, filed on Jun. 19, 2014, which claims the benefit of U.S. Provisional Application No. 61/924,176, filed on Jan. 6, 2014 and 61/936,278, filed on Feb. 5, 2014, the contents of which are all hereby incorporated by reference herein in their entirety.

BACKGROUND OF THE INVENTION

Field of the Invention

The present invention relates to wireless communication and, more particularly, to a method and apparatus for sounding in a wireless LAN (wireless local area network, WLAN).

Related Art

A station (STA) supporting the Institute of Electrical and Electronics Engineers (IEEE) 802.11a standard may have a transmission rate of up to 54 MPs when transmitting data through a 20 MHz channel bandwidth in a 5 GHz frequency band based on orthogonal frequency division multiplexing (OFDM).

The STA supporting the IEEE 802.11n standard may have a transmission rate of up to 600 MPs when transmitting data through a 20 or 40 MHz channel bandwidth in a 2.4 or 5 GHz frequency band based on multiple-input and multiple-output (MIMO).

The IEEE 802.11a standard is aimed at providing a 1 Gbps or greater throughput in a medium access control (MAC) service access point (SAP) layer. A wireless local area network (WLAN) system supporting the IEEE 802.11ac standard may also referred to as a very high throughput (VHT) system. For a 1 Gbps or greater throughput in the MAC SAP layer, the VHT system may support 80/160 MHz channel bandwidths and eight spatial streams (or space-time streams). When the VHT system supports a 160 MHz channel bandwidth, up to eight spatial streams, 256-quadrature amplitude modulation (QAM), and a short guard interval (GI), an STA supporting the VHT system may have a transmission rate of up to 6.9 Gbps when transmitting data in a physical layer.

To satisfy the foregoing throughput, a plurality of VHT STAs supporting the VHT system may simultaneously transmit and receive data through the same channel in communications with an access point (AP). The VHT AP may simultaneously transmit data to the plurality of VHT STAs based on space division multiple access (SDMA) or MU-MIMO. That is, data may be simultaneously transmitted or received between the plurality of VHT STAs and the VHT AP.

Currently, with an increasing demand for high-quality multimedia transmission, unlicensed frequency bands tend to expand. Further, channel bandwidths used for the existing WLAN standard make it difficult to secure contiguous 160 MHz channel bandwidths for IEEE 802.11ac. Therefore, IEEE 802.11ac may use 160 MHz channel bandwidths of aggregated non-contiguous channels.

SUMMARY OF THE INVENTION

Technical Objects

An object of the present invention is to provide a method for sounding in a wireless communication system.

Another object of the present invention is to provide an apparatus that performs the sounding method is a wireless communication system.

Technical Solutions

In order to achieve the above-described object of the present invention, according to an aspect of the present invention, a sounding method in a wireless LAN may include the steps of receiving a NDPA (null data packet announcement) frame by a STA (station) from an AP (access point), receiving a NDP (null data packet) frame based on identification information included in the NDPA frame by the STA, and transmitting channel state information being decided based on the NDP frame by the STA to the AP, and wherein the NDPA frame may be demodulated based on first FFT (fast fourier transform), and wherein the NDP frame may be demodulated based on second FFT.

In order to achieve the above-described object of the present invention, according to another aspect of the present invention, as a STA (station) performing sounding in a wireless LAN, the STA may include a RF (radio frequency) unit configured to transmit or receive radio signals, and a processor being optionally connected to the RF unit, wherein the processor may be configured to receive a NDPA (null data packet announcement) frame from an AP (access point), to receive a NDP (null data packet) frame based on identification information included in the NDPA frame, and to transmit channel state information being decided based on the NDP frame to the AP, and wherein the NDPA frame may be demodulated based on first FFT (fast fourier transform), and wherein the NDP frame may be demodulated based on second FFT.

Effects of the Invention

By using a PPDU, which is generated based on different IFFTs, the efficiency of a MAC (medium access control) layer and/or a PHY (physical) layer may be increased and the data throughput size and frequency efficiency may be increased.

DESCRIPTION OF EXEMPLARY EMBODIMENTS

Figure 1:
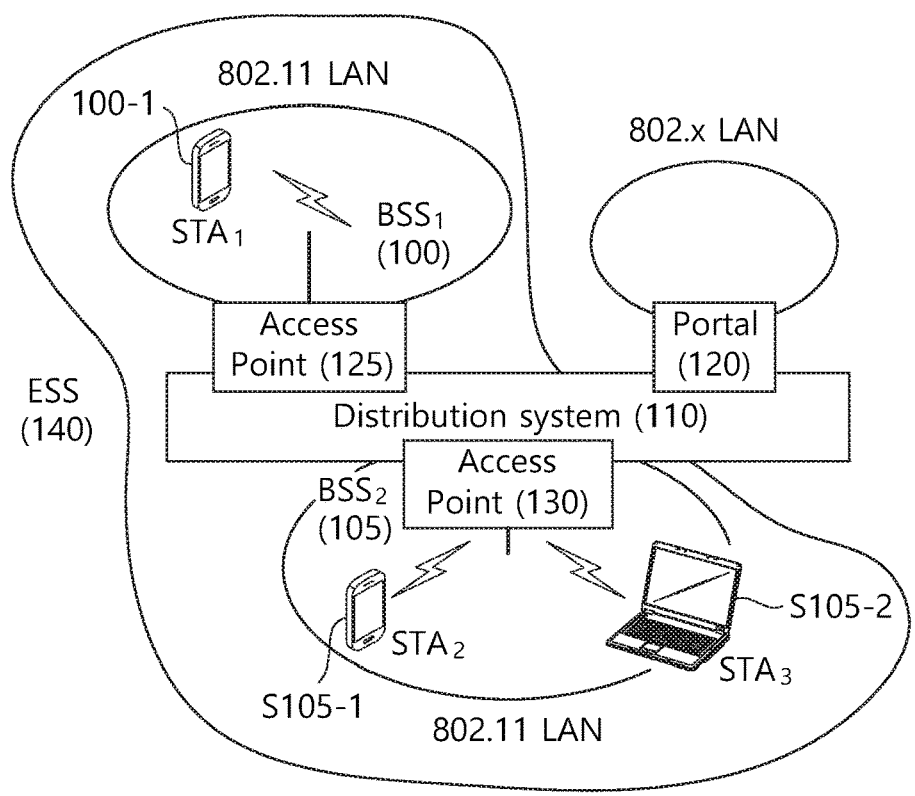
FIG. 1 is a concept view illustrating the structure of a wireless local area network (WLAN).
Figure 1:
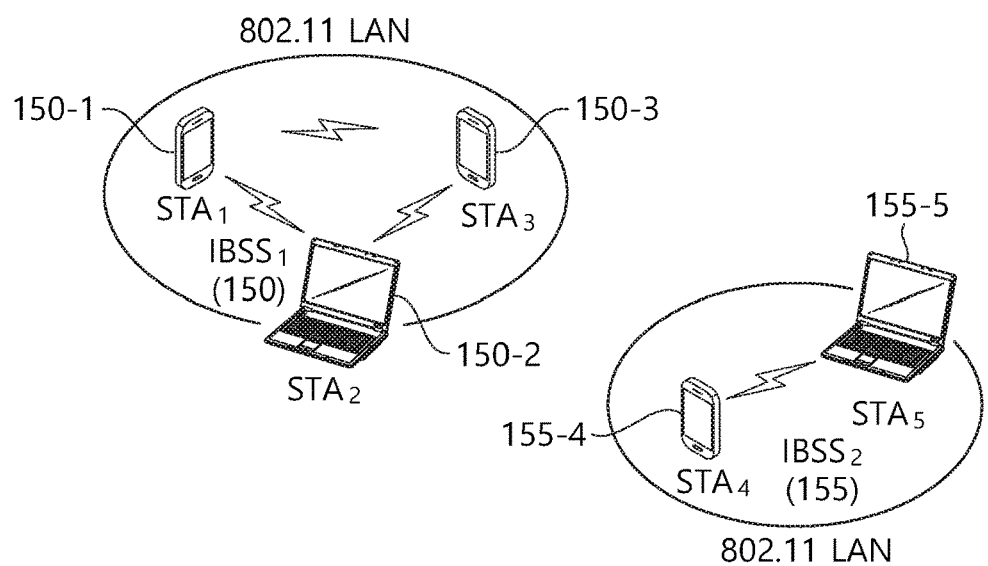

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, includes both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
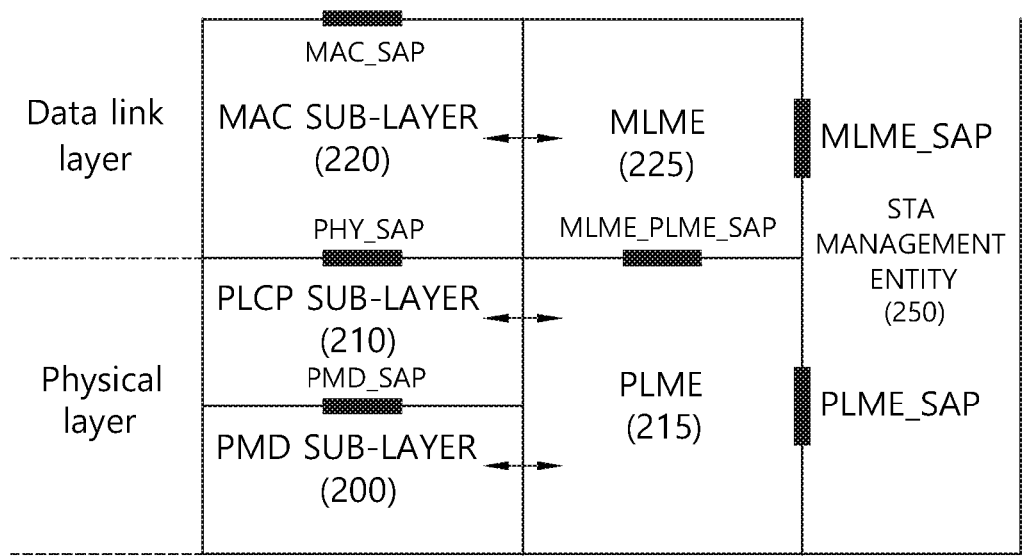
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Hereinafter, in the exemplary embodiment of the present invention, operations of the VHT system, which supports the IEEE 802.11ac in a 2.4 GHz ISM frequency band, will be disclosed.

The VHT system may support an 80 MHz channel band or a 160 MHz channel band in a 5 GHz frequency band. Additionally, the VHT system may support 8 spatial streams (or space-time streams), 256QAM (quadrature amplitude modulation). However, in case the VHT system operates in a 2.4 GHz frequency band, it will be difficult to support the 80 MHz channel band or the 160 MHz channel band. Accordingly, in case the VHT system mostly operates in the 2.4 GHz frequency band, the communication between the AP and the STA may be carried out through a 20 MHz channel band or a 40 MHz channel band.

Accordingly, in case the communication between the AP and the STA is carried out through the 20 MHz channel band or the 40 MHz channel band, it is important to increase the efficiency of the MAC (medium access control)/PHY (physical) layer of the AP and/or STA. In the exemplary embodiment of the present invention, a VHT system using 256 IFFT from the conventional 64 IFFT (inverse fast fourier transform) with respect to the 20 MHz channel band is disclosed. Additionally, in the exemplary embodiment of the present invention, a VHT system using 512 IFFT from the conventional 128 IFFT with respect to the 40 MHz channel band is disclosed. Hereinafter, in the exemplary embodiment of the present invention, although a method of using IFFT having its size changed in the PPDU (PLCP (physical layer convergence procedure) protocol data unit), which is being transmitted in a 20 MHz channel band or a 40 MHz channel band of the 2.5 GHz frequency band, is mostly disclosed, IFFT having its size changed in a PPDU, which is being transmitted in an 80 MHz channel band or a 160 MHz channel band of the 5 GHz frequency band, may also be used, and, such exemplary embodiment is also included in the scope of the present invention.

In a VHT system that operates in a frequency band of 2.5 GHz according to the exemplary embodiment of the present invention, when performing OFDM modulation based on 256 IFFT and 512 IFFT, the length of a guard interval configuring the OFDM symbol may use 0.8 us or 0.4 us depending on the WLAN environment. In this case, time resource that is being allocated as the guard interval may be relatively decreased within the OFDM symbol. Accordingly, as compared to the conventional IEEE802.11n, the throughput may be enhanced to approximately 30%. Hereinafter, a VHT system that supports a PPDU, which is generated based on IFFT having different sizes, will be disclosed in detail.

Figure 3:
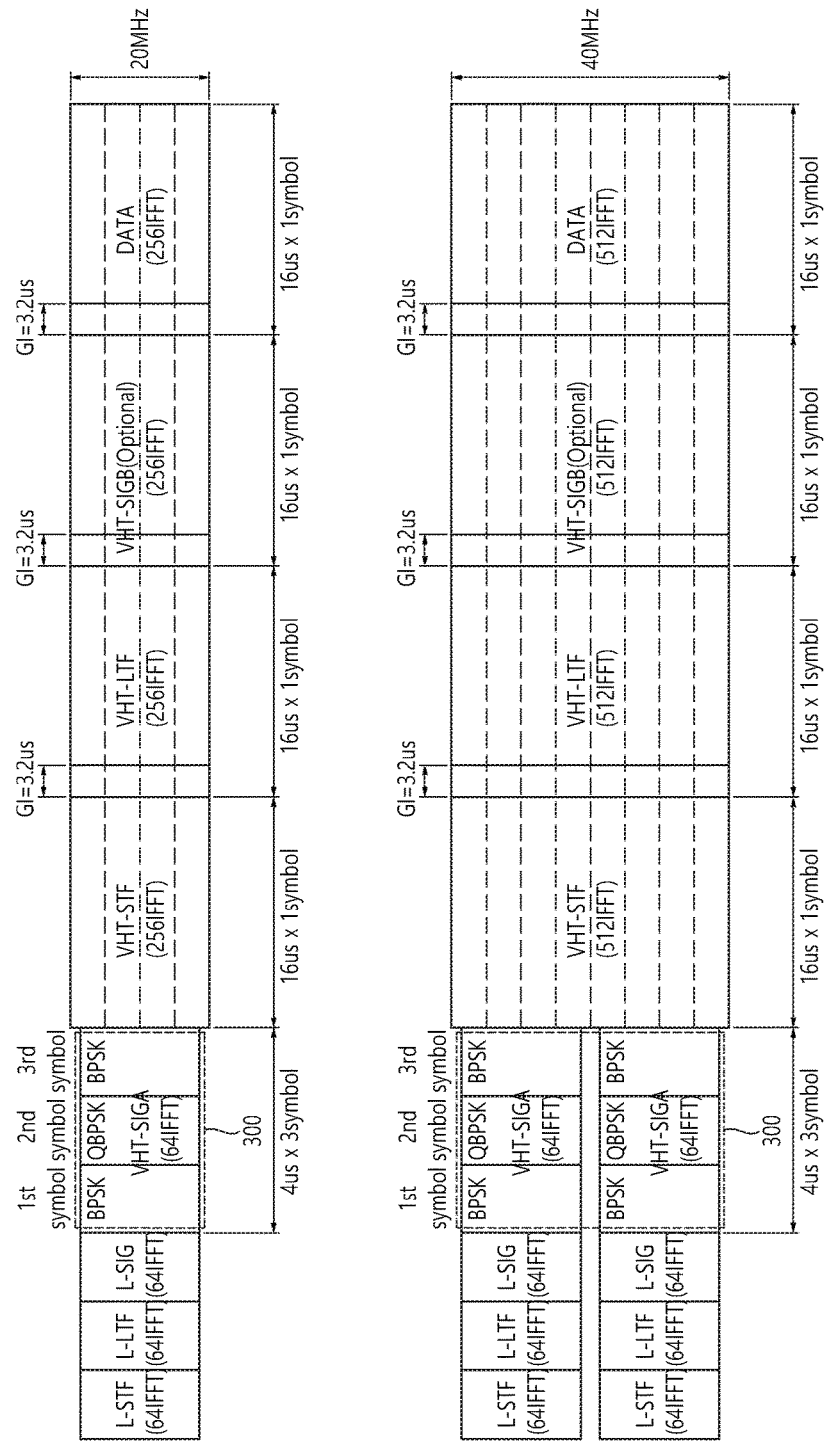
FIG. 3 is a concept view showing a PPDU supporting a VHT system according to an exemplary embodiment of the present invention.

FIG. 3 is a concept view showing a PPDU supporting a VHT system according to an exemplary embodiment of the present invention.

An upper part of FIG. 3 illustrates a PPDU for carrying out communication between the AP and the STA in a 20 MHz channel band of the VHT system.

A lower part of FIG. 3 illustrates a PPDU for carrying out communication between the AP and the STA in a 40 MHz channel band of the VHT system.

L-STF, L-LTF, and L-SIG may be transmitted for backward compatibility with a legacy STA, which supports the conventional WLAN system (e.g., IEEE 802.11g/n, etc).

L-STF may include a short training OFDM (orthogonal frequency division multiplexing) symbol. The L-STF 300 may be used for frame detection, AGC (automatic gain control), diversity detection, and coarse frequency/time synchronization.

L-LTF may include a long training OFDM (orthogonal frequency division multiplexing) symbol. The L-LTF may be used for fine frequency/time synchronization and channel estimation.

L-SIG may be used for transmitting control information. L-SIG may include information on data transmission rate and data length.

More specifically, by delivering information on a transmission time of a VHT associated signal and a PSDU that are to be transmitted subsequently, the L-SIG may prevent collision with the PPDU, which is delivered from the legacy STA, thereby being capable of protecting the PSDU.

In case of the conventional system, the L-STF, L-LTF, and L-SIG may all be transmitted over an OFDM symbol and a sub-carrier, which are generated based on 64 IFFT.

In case of the L-SIG, among 64 sub-carriers that are generated based on 64 IFFT, 48 sub-carriers may be used for transmitting L-SIG data. Among the 64 sub-carriers, with the exception for the 48 sub-carriers that are used for transmitting the L-SIG, 16 sub-carriers may be used for the boundary between pilot signals and channels. Among the 16 sub-carriers, 4 sub-carriers may be used as pilot, and the remaining 12 sub-carriers may be used as guards for the boundary of the channel bandwidth.

A VHT-SIG-A 300 may include information for the encoding/decoding of the PSDU. For example, the VHT-SIG-A 300 may include information on bandwidth, MCS, Number of Spatial Streams, Partial AID, Group ID, STBC, Beam-forming, Coding bit, and so on. Detailed description on the information included in the VHT-SIG-A 300 is described in Table 22-12—Fields in the VHT-SIG-A field of the 22.3.8.3.3 VHT-SIG-A definition of the IEEE Standard for Information technology telecommunications and information exchange between systems local and metropolitan area networks specific requirements "Part 11: Wireless LAN Medium Access Control (MAC) and Physical Layer (PHY) Specifications Amendment 4: Enhancements for Very High Throughput for Operation in Bands below 6 GHz" (hereinafter referred to as IEEE 802.11 ac specification).

For example, the VHT-SIG-A 300 may include information for interpreting a VHT format PPDU. The VHT-SIG-A 300 may include VHT-SIG-A1 and VHT-SIG-A2. The VHT-SIG-A1 may include bandwidth information of the channel that is being used, information on whether or not space-time block coding is being applied, information on a group ID (identifier), which indicates the STA group for the MU (multi-user)-MIMO transmission and a number of streams that are being used, and so on.

The VHT-SIG-A2 may include information on whether or not a short guard interval (GI) is being used, FEC (forward error correction) information, information on MCS (modulation and coding scheme) respective to a single user, information on channel coding types respective to multiple users, information associated with beam-forming, redundancy bits for CRC (cyclic redundancy checking) and a tail bit for a convolutional decoder, and so on.

The VHT-SGF may be used for enhancing automatic gain control estimation in a MIMO environment.

The VHT-LGF is used for estimating channels in a MIMO environment.

The VHT-SIG-B may include information on each STA, i.e., information on PPDU length and MCS, tail bit, and so on.

The VHT-SIG-A 300, which corresponds to a field that is defined in Table 22-12—Fields in the VHT-SIG-A field of the 22.3.8.3.3 VHT-SIG-A definition of the above-described IEEE 802.11 ac specification, may be described over 2 OFDM symbols. More specifically, a lower field of the VHT-SIG-A 300 may be delivered over 2 OFDM symbols.

The VHT-SIG-A 300, which is included in the PPDU that supports the VHT system according to the exemplary embodiment of the present invention, may be transmitted over 3 OFDM symbols (a first OFDM symbol, a second OFDM symbol, and a third OFDM symbol). More specifically, in order to transmit the VHT-SIG-A 300, the conventional 2 OFDM symbols (the first OFDM symbol and the second OFDM symbol) and a third OFDM symbol, which corresponds to an additional OFDM, (third OFDM symbol) may be used. The third OFDM symbol may be used to support the change in the IFFT size within one PPDU. According to the exemplary embodiment of the present invention, the IFFT size of the OFDM symbol may be changed for the transmission of the fields (VHT-STF, VHT-LTF, VHT-SIG-B, DATA (data field)) that follow the VHT-SIG-A 300, and the third OFDM symbol for the VHT-SIG-A 300 may be used as a transition margin for the IFFT size.

More specifically, in the 20 MHz channel band, 64 IFFT may be used in order to transmit the VHT-SIG-A 300 and the fields preceding the VHT-SIG-A 300, and 256 IFFT may be used in order to transmit the fields following the VHT-SIG-A 300.

In the 40 MHz channel band, 64 IFFT may be used in order to transmit the VHT-SIG-A 300 and the fields preceding the VHT-SIG-A 300, and 512 IFFT may be used in order to transmit the fields following the VHT-SIG-A 300.

If the description is made based on the 20 MHz channel band, the distance between corresponding sub-carriers when 64 IFFT is used and the distance between corresponding sub-carriers when 256 IFFT is used may be different from one another. The distance between the sub-carriers may be expressed by a term, which is referred to as sub-carrier spacing. Accordingly, a transition margin for the demodulation of a receiving STA with respect to the changed sub-carrier spacing within the PPDU may be required. The third OFDM symbol of the VHT-SIG-A 300 may perform the function (or role) of a transition margin. According to the exemplary embodiment of the present invention, an arbitrary specific sequence or specific field may be transmitted over the third OFDM symbol for the VHT-SIG-A 300. For example, the CRC and tail within the first OFDM symbol and the second OFDM symbol may be replaced by the CRC and tail within the third OFDM symbol.

In case the size of the IFFT is changed from 64 IFFT to 256 IFFT, and in case the sub-carrier spacing becomes different from one another, the receiving STA may also immediately perform demodulation with respect to the changed sub-carrier spacing for the transmission of one PPDU. In this case, the third OFDM symbol for the transmission of the VHT-SIG-A 300 may be omitted, and the VHT-SIG-A 300 may be transmitted over 2 OFDM symbols.

In order to allow the third OFDM symbol for the VHT-SIG-A 300 to perform the function of the transition margin, the receiving user equipment should detect a VHT preamble by receiving the first OFDM symbol and the second OFDM symbol of the VHT-SIG-A 300, and should, then, be capable of acquiring information on sub-carrier spacing of the OFDM symbol that is being transmitted after the VHT-SIG-A 300 and information on the guard interval.

Figure 4:
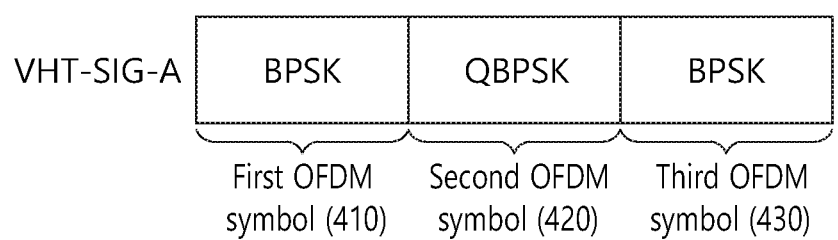
FIG. 4 is a concept view showing a VHT-SIG-A of a PPDU according to an exemplary embodiment of the present invention.

FIG. 4 is a concept view showing a VHT-SIG-A of a PPDU according to an exemplary embodiment of the present invention.

FIG. 4 illustrates a modulation symbol that is transmitted over 3 OFDM symbols 410, 420, and 430 for the VHT-SIG-A.

A modulation symbol that is transmitted over the first OFDM symbol 410 may be generated based on BPSK (binary phase shift keying).

A modulation symbol that is transmitted over the second OFDM symbol 420 may be generated based on QBPSK (quadrature binary phase shift keying).

A modulation symbol that is transmitted over the third OFDM symbol 430 may be generated based on BPSK.

BPSK may correspond to a modulation method that is based on a constellation according to which binary data are mapped to a real axis. Conversely, QBPSK may correspond to a modulation method that is based on a constellation according to which binary data are mapped to an imaginary axis. BPSK and QBPSK may have a phase difference of 90 degrees. QBPSK may have a constellation that is rotated counter-clockwise by 90 degrees with respect to BPSK. More specifically, the constellation of the modulation symbol within the second OFDM symbol 420 for the transmission of the VHT-SIG-A may correspond to a QBPSK constellation, which corresponds to the constellation of the modulation symbol within the first OFDM symbol 410 for the transmission of the VHT-SIG-A that is rotated counter-clockwise by 90 degrees.

The receiving STA may detect whether or not a VHT preamble has been transmitted based on the modulation symbols that are transmitted over the first OFDM symbol 410 and the second OFDM symbol 420 for the transmission of the VHT-SIG-A.

The conventional fields that were transmitted over the first OFDM symbol 410 and the second OFDM symbol 420 may also be transmitted over the third OFDM symbol for the transmission of the VHT-SIG-A. For example, MCS, CRC, tail, and so on, respective to the data may be transmitted over the third OFDM symbol 430. In this case, the conventional MCS, CRC, tail, and so on, which were transmitted over the first OFDM symbol 410 and the second OFDM symbol 420, may be transmitted over the third OFDM symbol 430 instead. More specifically, the CRC and tail within the first OFDM symbol 410 and the second OFDM symbol 420 may be replaced by the CRC and tail that are transmitted over the third OFDM symbol 430. Based on the CRC within the third OFDM symbol 430, error detection respective to the information being transmitted over the first OFDM symbol 410, the second OFDM symbol 420, and the third OFDM symbol 430 may be performed.

In the PPDU that supports the VHT system, L-STF, L-LTF, L-SIG, and VHT-SIG-A may be transmitted first-hand. In case the communication between the AP and the STA is carried out through a 20 MHz channel band, the transmission of the L-STF, L-LTF, L-SIG, and VHT-SIG-A may be performed over an OFDM symbol, which is generated based on 64 IFFT.

In case the communication between the AP and the STA is carried out through a 40 MHz channel band, the data within the OFDM symbol, which is generated based on 64 IFFT in the 20 MHz band may be duplicated in another 20 MHz band and may then be transmitted through a 40 MHz band. More specifically, the transmission of the L-STF, L-LTF, L-SIG, and VHT-SIG-A may be repeated (or duplicated) in the 40 MHz band in units of 20 MHz channel band units. In order to reduce the PAPR (peak to average power ratio) of the signal that is being transmitted in the 40 MHz channel band, a phase modulation of $\{1,j\}$ may be performed on the data that are being transmitted in each of the 20 MHz channel bands of the 40 MHz channel band.

After the VHT-SIG-A, VHT-STF, VHT-LTF, VHT-SIG-B, and data field may be transmitted. In case the communication between the AP and the STA is carried out through a 20 MHz channel band, VHT-STF, VHT-LTF, VHT-SIG-B, and data field may be transmitted over an OFDM symbol, which is generated based on 256 IFFT.

In case the communication between the AP and the STA is carried out through a 40 MHz channel band, VHT-STF, VHT-LTF, VHT-SIG-B, and data field may be transmitted over an OFDM symbol, which is generated based on 512 IFFT.

In case the size of the IFFT is increased by 4 times from 64 to 256 within the same channel band, the length of the OFDM symbol may be increased from 4 us to 16 us. Additionally, in case the size of the IFFT is increased by 4 times from 64 to 256 within the same channel band, the length of the GI (guard interval) may also be increased from 0.8 us to 3.2 us.

As described above, the VHT-STF may be used for frequency offset estimation and phase offset estimation. The VHT-LTF may be used for channel estimation in order to decode the VHT-SIG-B and data field. Depending on the number of spatial streams that are transmitted, 1, 2, 4, 6, or 8 VHT-LTFs may be consecutively (or contiguously) transmitted through one PPDU.

The VHT-SIG-B may be optionally included in the PPDU. For example, the VHT-SIG-B may include user specific information (e.g., MCS and length information, and so on) respective to the PPDU that is being transmitted via MU-MIMO, OFDMA transmission.

If the VHT-SIG-A may be transmitted through 3 OFDM symbols, and if information of the VHT-SIG-B may be transmitted through the VHT-SIG-A, the VHT-SIG-B may not be transmitted. Detailed description on the information that is being transmitted through the VHT-SIG-B is described in table 22-14 Fields in the VHT-SIG-B field of the 22.3.8.3.6 VHT-SIG-B definition of the IEEE 802.11 ac specification.

In case the channel bandwidth is equal to 20 MHz, the VHT-STF, VHT-LTF, VHT-SIG-B, and data field, which are generated based on 256 IFFT, may be transmitted as VHT-STF, VHT-LTF, VHT-SIG-B, and data field, which are transmitted based on 256 IFFT through an 80 MHz channel band in an IEEE 802.11ac 5 GHz VHT system, being processed to a ¼ down-clocked format to fit the 20 MHz channel bandwidth.

As ¼ down-clocking is carried out, the length of the OFDM symbol may be increased to four times. More specifically, the duration of one OFDM symbol in a ¼ down-clocked frame may be equal to 16 us, which corresponds to 4 times the 4 us, which corresponds to the duration of one OFDM symbol of the conventional PPDU that is not processed with ¼ down-clocking.

In case the channel bandwidth is equal to 40 MHz, the VHT-STF, VHT-LTF, VHT-SIG-B, and data field, which are generated based on 512 IFFT, may be transmitted as VHT-STF, VHT-LTF, VHT-SIG-B, and data field, which are transmitted based on 512 IFFT through a 160 MHz channel band in an IEEE 802.11ac 5 GHz VHT system, being processed to a ¼ down-clocked format to fit the 40 MHz channel bandwidth.

The sequence of a VHT-LTF for 256 IFFT being transmitted through an 80 MHz channel band in the IEEE 802.11ac 5 GHz VHT system is as shown below.

$$VHTLTF_{-122,122} = \{LTF_{left}, 1, LTF_{right}, -1, -1, -1, 1, 1, -1,\\ 1, -1, 1, 1, -1, LTF_{left}, 1, LTF_{right}, 1, -1, 1, -1, 0, 0, 0, 1, -\\ 1, -1, 1, LTF_{left}, 1, LTF_{right}, -1, -1, -1, 1, 1, -1, 1, -1, 1,\\ 1, -1, LTF_{left}, 1, LTF_{right}\}$$

$$LTF_{left} = \{1, 1, -1, -1, 1, 1, -1, 1, -1, 1, 1, 1, 1, 1, 1, -1, -1, 1, 1, -\\ 1, 1, -1, 1, 1, 1, 1\}$$

$$LTF_{right} = \{1, -1, -1, 1, 1, -1, 1, -1, 1, -1, -1, -1, -1, 1, 1, -\\ 1, -1, 1, -1, 1, -1, 1, 1, 1, 1\} \quad <\text{Equation 1}>$$

According to the exemplary embodiment of the present invention, a VHT-LTF sequence for 256 IFFT, which is shown in Equation 1, may be processed with ¼ down-clocking, so as to be transmitted through a 20 MHz channel bandwidth.

A VHT-LTF for 512 IFFT being transmitted through a 160 MHz channel band in the IEEE 802.11ac 5 GHz VHT system is as shown below in Equation 2.

$$VHTLTF_{-250,250} = \{VHTLTF_{-122,122}, 0, 0, 0, 0, 0, 0, 0, 0, 0,\\ 0, 0, VHTLTF_{-122,122}\} \quad <\text{Equation 2}>$$

According to the exemplary embodiment of the present invention, a VHT-LTF sequence for 512 IFFT, which is shown in Equation 2, may be processed with ¼ down-clocking, so as to be transmitted through a 40 MHz channel bandwidth.

A pilot signal respective to 256 IFFT, which is transmitted through an 80 MHz channel band in the IEEE 802.11ac 5 GHz VHT system in association with the transmission of the data field, is as shown below in Equation 3.

$$P_n^{\{-103,-75,-39,-11,11,39,75,103\}} = \{\Psi_{n \bmod 8},\\ \Psi_{(n+1) \bmod 8}, \ldots, \Psi_{(n+7) \bmod 8}\}$$

$$P_n^{k \notin \{-103,-75,-39,-11,11,39,75,103\}} = 0 \quad <\text{Equation 3}>$$

Herein, $\Psi_m$ is as shown below in Table 1.

TABLE 1

| $\Psi_0$ | $\Psi_1$ | $\Psi_2$ | $\Psi_3$ | $\Psi_4$ | $\Psi_5$ | $\Psi_6$ | $\Psi_7$ |
|---|---|---|---|---|---|---|---|
| 1 | 1 | 1 | −1 | −1 | 1 | 1 | 1 |

Pilot mapping $P_n^k$ represents a mapping relation between a pilot sequence and a sub-carrier by using symbol n with respect to sub-carrier k. In a transmission through an 80 MHz channel band, 8 pilot tones may be transmitted through sub-carriers corresponding to sub-carrier indexes −103, −75, −39, −11, 11, 39, 79, and 103.

According to the exemplary embodiment of the present invention, the pilot signal that is shown in Equation 3 may be processed with ¼ down-clocking and may then be transmitted through a 20 MHz channel band.

Additionally, the pilot sequence for 512 IFFT, which is transmitted through 160 MHz channel band in the IEEE 802.11ac 5 GHz VHT may correspond to a form that is repeated in two 80 MHz channel bands, which are included in the 160 MHz channel band.

A pilot signal respective to 512 IFFT, which is transmitted through a 160 MHz channel band in the IEEE 802.11ac 5 GHz VHT system in association with the transmission of the data field, is as shown below in Equation 4.

$$P_n\{-231,-203,-167,-139,-117,-89,-53,-25,25,53,89,117,139,167,$$
$$203,231\}=\{\Psi_{n \bmod 8}, \Psi_{(n+1)\bmod 8}, \Psi_{(n+2)\bmod 8},$$
$$\Psi_{(n+3)\bmod 8}, \Psi_{(n+4)\bmod 8}, \Psi_{(n+5)\bmod 8},$$
$$\Psi_{(n+6)\bmod 8}, \Psi_{(n+7)\bmod 8}, \Psi_{n \bmod 8}, \Psi_{(n+1)\bmod 8},$$
$$\Psi_{(n+2)\bmod 8}, \Psi_{(n+3)\bmod 8}, \Psi_{(n+4)\bmod 8},$$
$$\Psi_{(n+5)\bmod 8}, \Psi_{(n+6)\bmod 8}, \Psi_{(n+7)\bmod 8}\}$$

$$P_n^{k \notin \{-231,-203,-167,-139,-117,-89,-53,-25,25,53,89,117,139,}$$
$${}^{167,203,231\}}=0 \quad \text{<Equation 4>}$$

Herein, $\Psi_m$ is as described above in Table 1.

According to the exemplary embodiment of the present invention, a pilot sequence, which is shown in Equation 4, may be processed with ¼ down-clocking, so as to be transmitted through a 40 MHz channel bandwidth.

As described above, according to the exemplary embodiment of the present invention, in order to enhance the efficiency in the MAP layer and/or PHY layer, part of the fields that are transmitted in the 20 MHz channel bandwidth may be generated based on 256 IFFT instead of the conventional 64 IFFT. Additionally, part of the fields that are transmitted in the 40 MHz channel bandwidth may be generated based on 512 IFFT instead of the conventional 64 IFFT.

In case of using 256 IFFT and 512 IFFT, the guard interval of the OFDM symbol is increased from 0.8 us to 3.2 us. According to the exemplary embodiment of the present invention, in case the guard interval of the OFDM symbol is decreased to 0.8 us, the throughput may be enhanced as compared to the conventional WLAN.

Figure 5:
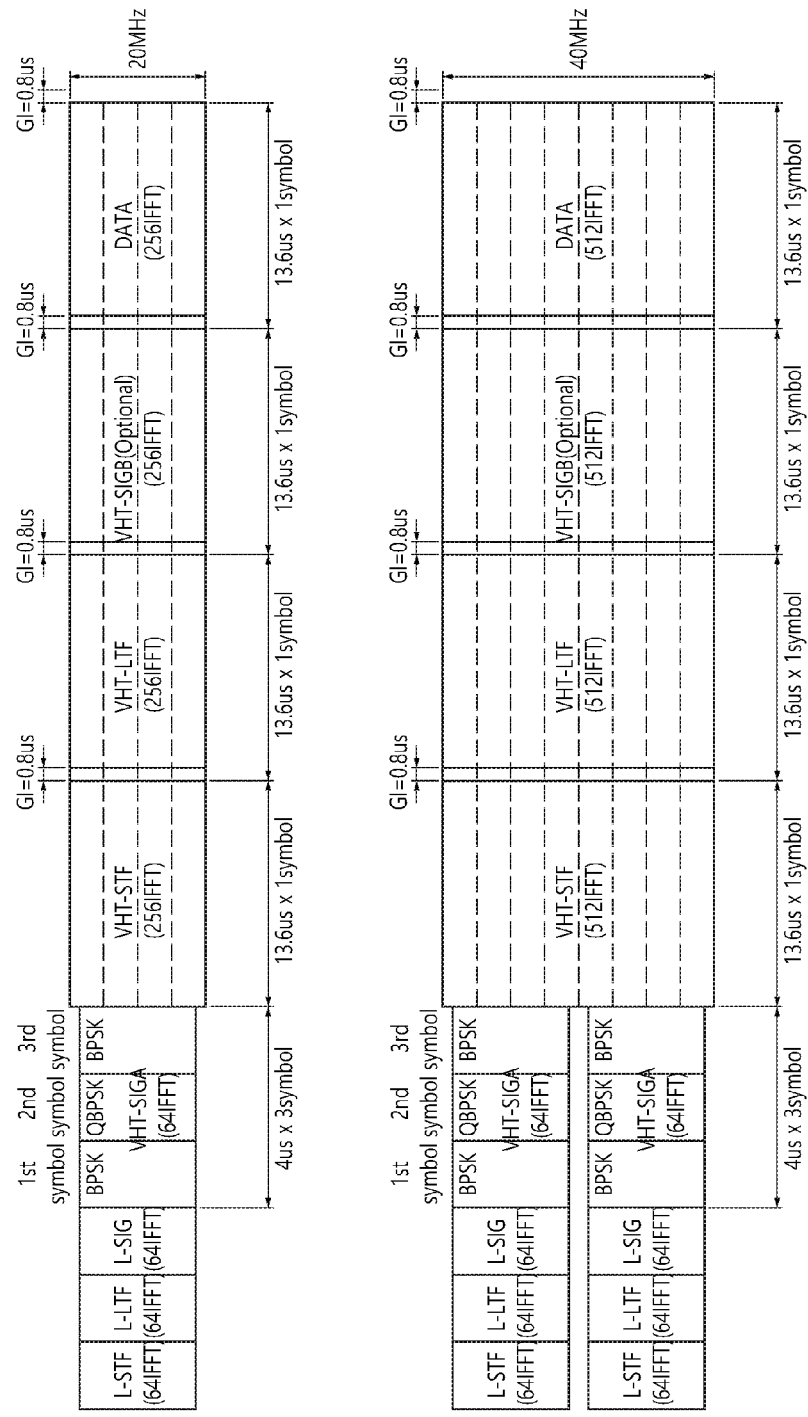
FIG. 5 is a concept view showing a PPDU supporting a VHT system according to an exemplary embodiment of the present invention.

FIG. 5 is a concept view showing a PPDU supporting a VHT system according to an exemplary embodiment of the present invention.

FIG. 5 illustrates a GI having its duration decreased in the OFDM symbol transmitting VHT-STF, VHT-LTF, VHT-SIG-B, and data field, which are generated based on 256 IFFT in the PPDU of the VHT system. The duration of the GI may be decreased from 3.2 us to 0.8 us.

In case the duration of the GI is decreased from 3.2 us to 0.8 us, the duration of the OFDM symbol for each of the VHT-STF, VHT-LTF, VHT-SIG-B, and data field may be decreased from 16 us to 13.6 us, and a relatively larger amount of time resource may be ensured for data transmission. Accordingly, additional throughput gain may be acquired.

Figure 6:
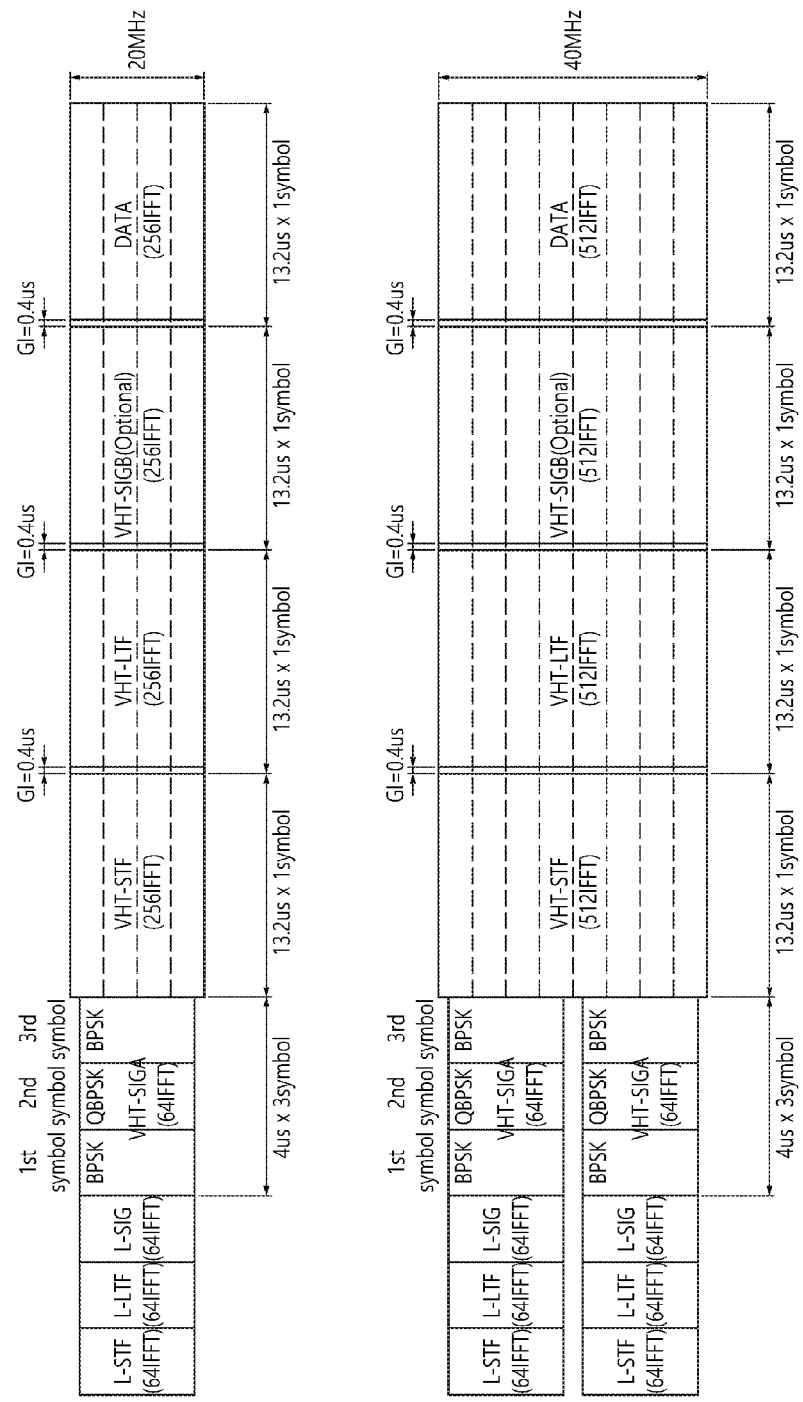
FIG. 6 is a concept view showing a PPDU supporting a VHT system according to an exemplary embodiment of the present invention.

FIG. 6 is a concept view showing a PPDU supporting a VHT system according to an exemplary embodiment of the present invention.

FIG. 6 illustrates a GI having its duration decreased in the OFDM symbol transmitting VHT-STF, VHT-LTF, VHT-SIG-B, and data field, which are generated based on 512 IFFT in the PPDU of the VHT system. The duration of the GI may be decreased from 3.2 us to 0.4 us.

In case the duration of the GI is decreased from 3.2 us to 0.4 us, the duration of the OFDM symbol for each of the VHT-STF, VHT-LTF, VHT-SIG-B, and data field may be decreased from 16 us to 13.2 us, and additional throughput gain may be acquired. A GI of 0.4 us may also be used only in the data field, which is transmitted in a 2.4 GHz VHT system.

The L-SIG may deliver a VHT associated signal (VHT-SIG-A, VHT-STF, VHT-LTF, VHT-SIG-B) and information on the time resource for the transmission of the data field, which are transmitted after the L-SIG, to the STA. Another legacy STA may delay (or postpone) the transmission of the PPDU based on the information on the time resource for the transmission of the subsequent fields, which are transmitted through the L-SIG, and, based upon this delay, collision with the PPDU may be prevented.

At this point, the transmission time resource (or transmission time of the PSDU) may be configured by assuming the duration respective to one OFDM symbol to be equal to 4.0 us. As described above in FIG. 5 and FIG. 6, the duration of the OFDM symbol for transmitting the VHT-STF, VHT-LTF, VHT-SIG-B, and data field may be equal to 13.6 us and 13.2 us. Accordingly, the transmission time of the PSDU that is actually being transmitted may not match with the boundary of the 4 us unit.

In case the duration of the OFDM symbol, which is being used for transmitting the VHT-STF, VHT-LTF, VHT-SIG-B, and data field, is equal to 13.6 us and 13.2 us, a total OFDM symbol duration, a misaligned duration, and a signal extension duration are shown in Table 2.

TABLE 2

| Number of OFDM symbols | Total OFDM Symbol Duration (13.6 us) | Misaligned Duration (13.6 us) | Signal Extension Duration (13.6 us) |
|---|---|---|---|
| 1 | 13.6 | 1.6 | 2.4 |
| 2 | 27.2 | 3.2 | 0.8 |
| 3 | 40.8 | 0.8 | 3.2 |
| 4 | 54.4 | 2.4 | 1.6 |
| 5 | 68 | 0 | 0 |
| 6 | 81.6 | 1.6 | 2.4 |
| 7 | 95.2 | 3.2 | 0.8 |
| 8 | 108.8 | 0.8 | 3.2 |
| 9 | 122.4 | 2.4 | 1.6 |
| 10 | 136 | 0 | 0 |

TABLE 3

| Number of OFDM Symbols | Total OFDM Symbol Duration (13.2 us) | Misaligned Duration (13.2 us) | Signal Extension duration (13.2 us) |
|---|---|---|---|
| 1 | 13.2 | 1.2 | 2.8 |
| 2 | 26.4 | 2.4 | 1.6 |
| 3 | 39.6 | 3.6 | 0.4 |
| 4 | 52.8 | 0.8 | 3.2 |
| 5 | 68 | 2 | 2 |
| 6 | 79.2 | 3.2 | 0.8 |
| 7 | 92.4 | 0.4 | 3.6 |
| 8 | 105.6 | 1.6 | 2.4 |
| 9 | 118.8 | 2.8 | 1.2 |
| 10 | 132 | 0 | 0 |

Table 2 corresponds to a case when the length of the OFDM symbol is equal to 13.6 us, as shown in FIG. 5, and Table 3 corresponds to a case when the length of the OFDM symbol is equal to 13.2 us, as shown in FIG. 6.

More specifically, the misaligned duration, which does not match with the boundary of the 4 us unit, may be decided in accordance with the total OFDM symbol duration with respect to the total number of OFDM symbols. The misaligned duration may indicate a degree of misalignment at the symbol boundary based on the OFDM symbol having a duration of 4.0 us.

The signal extension duration indicates a duration for the transmission of additional signals in order to match the boundary of the 4 us unit and the boundary of the total OFDM symbol duration.

Referring to Table 2, in case the duration of the OFDM symbol is equal to 13.6 us, the signal extension duration may be equal to 0.8 us, 1.6 us, 2.4 us, or 3.2 us. More specifically, the signal extension duration may be decided based on a function having the number of OFDM symbols as its variable by using multiples of 0.8 us. In case the number of OFDM symbols is equal to n, the signal extension duration may be decided based on (1.6*n mod 4).

Referring to Table 3, in case the duration of the OFDM symbol is equal to 13.2 us, the signal extension duration may be equal to 0.4 us, 0.6 us, 1.2 us, 1.6 us, 2.0 us, 2.8 us, 3.2 us, or 3.6 us. More specifically, the signal extension duration may be decided based on a function having the number of OFDM symbols as its variable by using multiples of 0.8 us. In case the number of OFDM symbols is equal to n, the signal extension duration may be decided based on (2.4*n mod 4).

Figure 7:
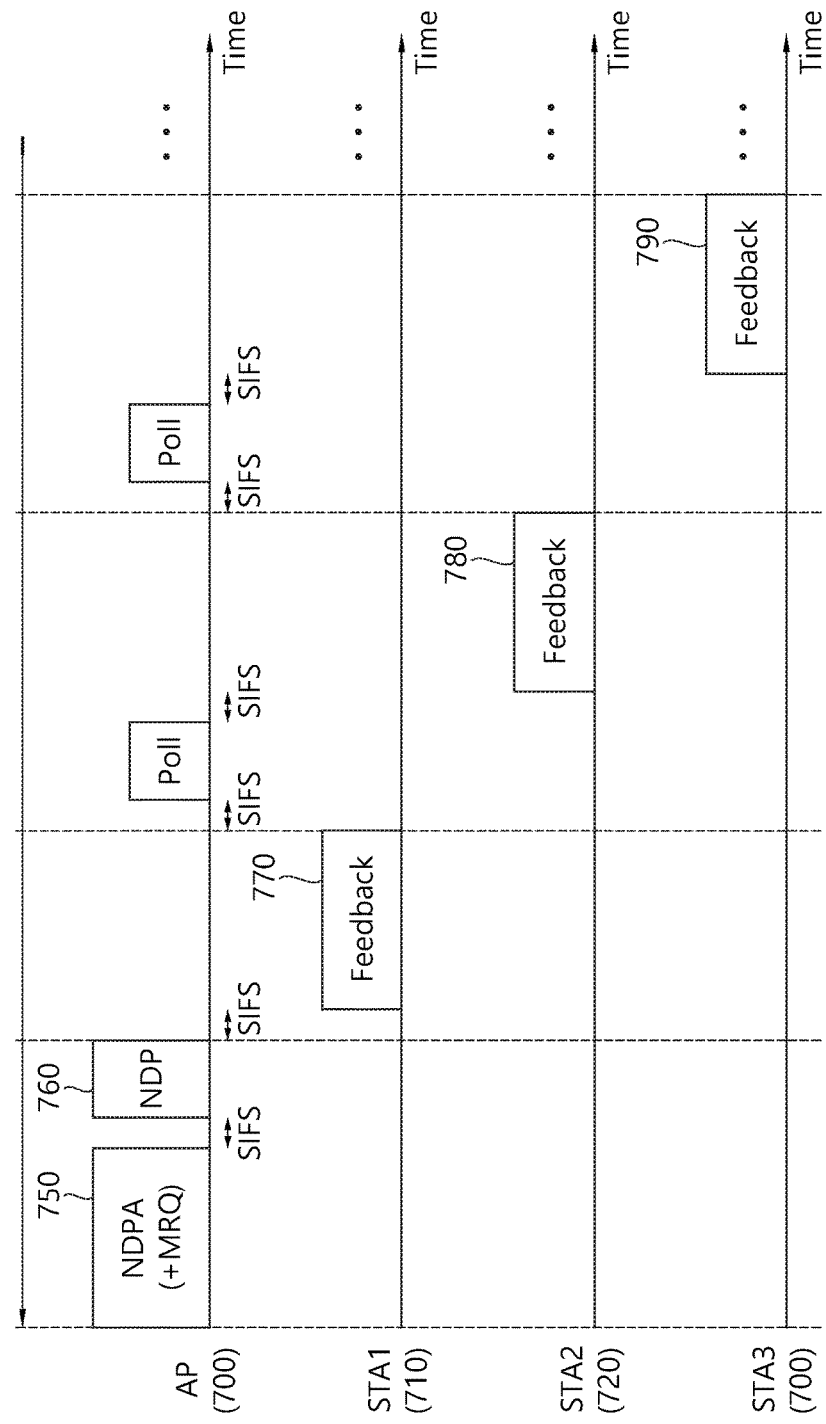
FIG. 7 is a concept view showing beam-forming transmission of an AP according to an exemplary embodiment of the present invention.

FIG. 7 is a concept view showing beam-forming transmission of an AP according to an exemplary embodiment of the present invention.

In case the AP transmits a PPDU to the STA based on a beam-forming transmission, FIG. 7 illustrates a sounding protocol for the beam-forming transmission.

The AP may acquire feedback information corresponding to the channel state information (CSI) between each STA and the AP by using the sounding protocol. The AP 700 may transmit a NDPA (null data packet announcement) frame 750 and a NDP (null data packet) frame 760 to a plurality of STAs 710, 720, and 730. The NDP frame 760 may not include a data field. A control field of the NDPA frame 750 may include information indicating the transmission of the NDP frame 760.

Each of the plurality of STAs 710, 720, and 730 may estimate the channel state information between the AP 700 and each STA 710, 720, and 730 based on the received NDP frame 760. The first STA 710, which is designated by the NDPA frame 750, receives the NDP frame 760 and, then, transmits feedback information 770 to the AP 700 after SIFS, and, thereafter, the STAs 720 and 730, which are polled by the AP 700, may sequentially transmit feedback information 780 and 790.

The feedback information may include channel state information between each STA 710, 720, and 730 and the AP 700. The NDP frame 750 corresponds to a PPDU having a PSDU length of 0, and the NDPA frame 750 is required to be transmitted before the NDP frame 760 is transmitted. The AP 700 may transmit information on target user equipments (e.g., target STAs) of the sounding procedure and information on the feedback information type based on the NDPA frame 760. It will be assumed that the target user equipment corresponds to the STA, which transmits the channel state information to the AP.

The AP 700 transmits the NDPA frame 750 and, then, after a time period corresponding to the SIFS, the AP 700 transmits the NDP frame 760. The target STAs 710, 720, and 730 may device the channel state information based on the received NDP frame 760. The STA 710, 720, and 730 may feed-back the decided (or determined) channel state information to the AP 700, which has requested sounding through a compressed beam-forming report frame.

The NDPA frame 750 is required to be transmitted to the target user equipments of the sounding procedure. A MAC payload of the NDPA frame 750 may include an AID (association identifier), a feedback type, an Nc Index with respect to each of the target user equipments of the sounding procedure.

The AID may include information on identifiers for indicating each of the plurality of target user equipments. In case the feedback type is equal to 0, this corresponds to feedback information respective to SU-MIMO, and, in case the feedback type is equal to 1, this may correspond to feedback information respective to MU-MIMO.

In case of the feedback information respective to MU-MIMO, the Nc Index may include information on a number of sequences respective to a compression beam-forming feedback matrix. In case the Nc Index is equal to 0, Nc may be equal to 1, in case the Nc Index is equal to 1, Nc may be equal to 2, and, in case the Nc Index is equal to 3, Nc may be equal to 4. In the feedback respective to SU-MIMO, the Nc Index may not be used.

Just as the NDPA frame, the NDP frame is transmitted to the STA in a state where beam-forming is not applied, and, then, the STA may decide the channel state information based on the received NDP frame.

Figure 8:
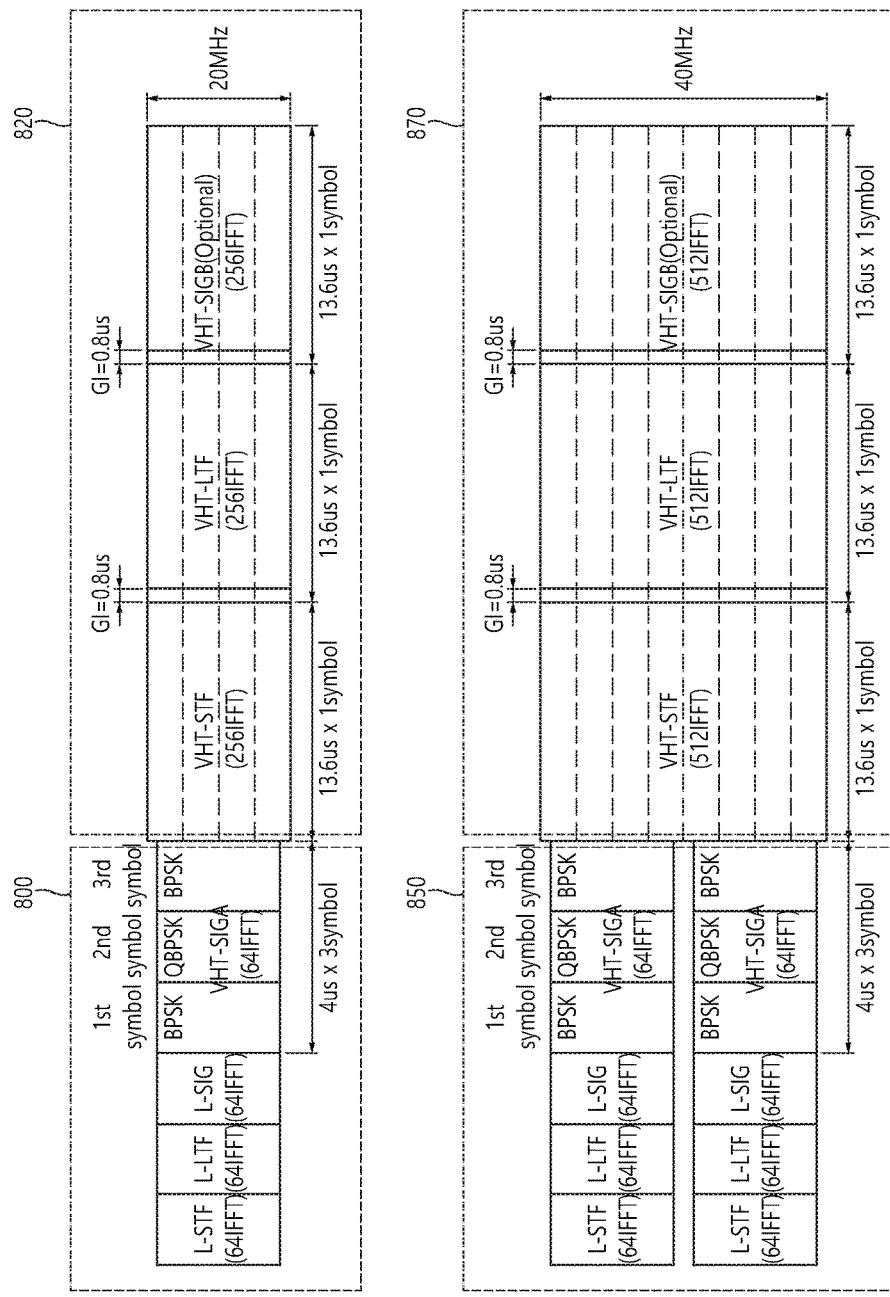
FIG. 8 is an NDP for sounding procedure according to an exemplary embodiment of the present invention.

FIG. 8 is an NDP for sounding procedure according to an exemplary embodiment of the present invention.

An upper part of FIG. 8 illustrates a NDP being transmitted in a 20 MHz channel band, and a lower part of FIG. 8 illustrates a NDP being transmitted in a 40 MHz channel band.

The L-STF, L-LTF, and L-SIG may be included in the NDP for the backward compatibility with the legacy STA, which supports IEEE 802.11g/n. As described above, the L-STF may be used for the frequency offset estimation and phase offset estimation. The L-LTF may be used for channel estimation in order to decode the L-SIG. The L-SIG may include information on a transmission time of fields included in the NDP that are transmitted after the L-SIG.

The legacy STA that has received the L-SIG may delay the transmission of the PPDU based on the information on the transmission time of the NDP. By using this method, collision between another PPDU and the NDP frame may be prevented.

The L-STF, L-LTF, L-SIG, and VHT-SIG-A 800 may all be transmitted over an OFDM symbol that is based on 64 IFFT. More specifically, the L-SIG may be transmitted through 64 sub-carriers over an OFDM symbol, which is generated based on 64 IFFT. Among the 64 sub-carriers, 48 sub-carriers may be used for transmitting data on the L-SIG, 4 sub-carriers may be used for the pilot, and the remaining sub-carriers may be used for the boundary between the channel bands.

The VHT-SIG-A may include a Bandwidth (BW), Nsts (Number of Spatial Stream), and PAID (Partial AID) as its lower fields.

The Bandwidth (BW) may correspond to a channel bandwidth that requests for sounding. The bandwidth of the NDP may have the same value as the bandwidth of the NDPA. For example, in case the value corresponding to the bandwidth is equal to 0, this may indicate the channel bandwidth of 20 MHz, and, in case the value corresponding to the bandwidth is equal to 1, this indicates the channel bandwidth of 40 MHz.

The Nsts may include information on the number of spatial streams that are being transmitted to the target STA for the sounding. The Nsts may decide the number of LTFs being transmitted after the SIG field.

The PAID may include information for indicating the target STA of the sounding procedure. In case a plurality of target STAs exist, the PAID may be set to 0. In case the number of target user equipment of the sounding procedure is equal to 1, the PAID may be set to a value having a hash function applied to the AID of the user equipment in order to indicate the corresponding target user equipment.

As described above, the VHT-SIG-A is transmitted over 3 OFDM symbols, and the third OFDM symbol, which corresponds to the last OFDM symbol among the 3 OFDM symbols, may perform the function of a transition margin.

Referring to the lower part of FIG. 8, in the NDP, the L-STF, L-LTF, L-SIG, and VHT-SIG-A 850 may be transmitted in a duplicated format over an OFDM symbol based on 64 IFFT through a 40 MHz channel bandwidth. Most particularly, the L-STF, L-LTF, L-SIG, and VHT-SIG-A 850 may be duplicated in 20 MHz channel bandwidth units and may then be transmitted in the 40 MHz channel bandwidth.

After the VHT-SIG-A, the VHT-STF, VHT-LTF, and VHT-SIG-B 820 and 870 may be transmitted through the PPDU. The VHT-SIG-B may also be omitted in order to reduce the overhead of the sounding protocol.

Referring to the upper part of FIG. 8, in case the PPDU is transmitted through a 20 MHz channel bandwidth, the transmission of the VHT-STF, VHT-LTF, and VHT-SIG-B may be transmitted over the OFDM symbol that is based on 256 IFFT.

Referring to the lower part of FIG. 8, in case the PPDU is transmitted through a 40 MHz channel bandwidth, the VHT-STF, VHT-LTF, VHT-SIG-B 870 may be transmitted over the OFDM symbol that is based on 512 IFFT.

Figure 9:
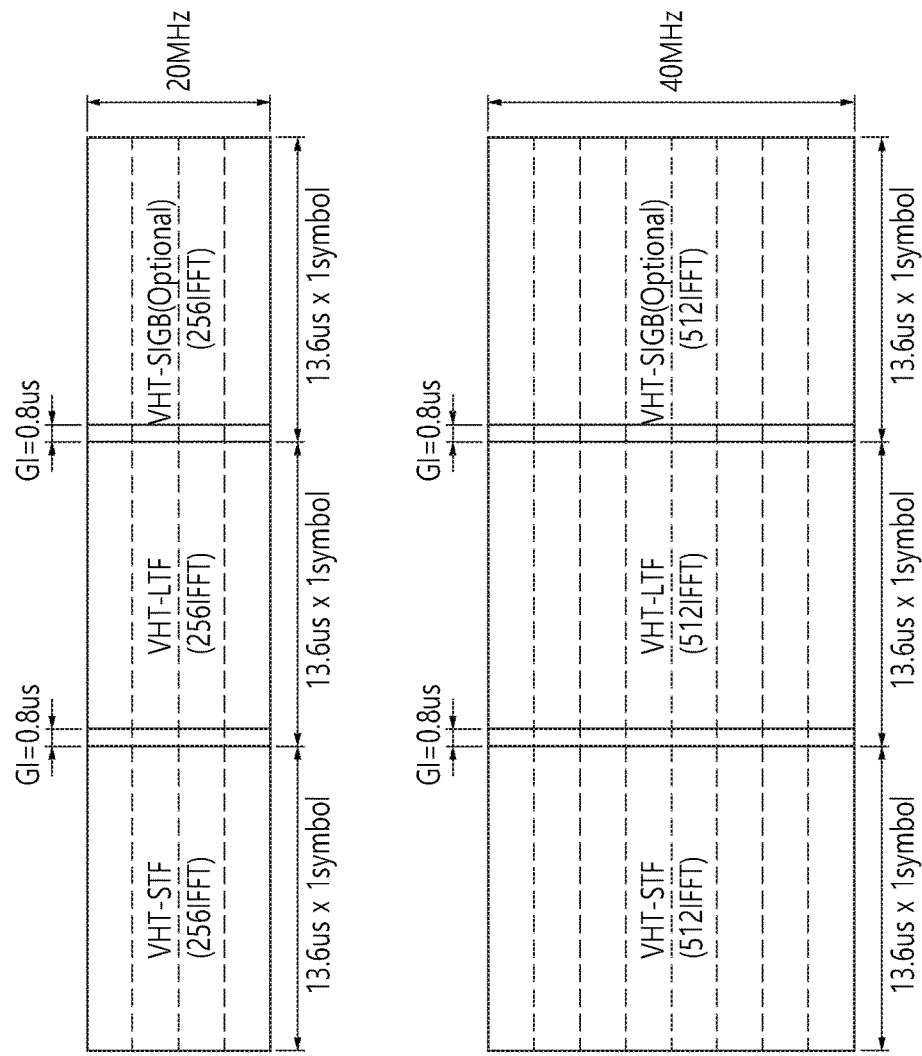
FIG. 9 is an NDP for sounding procedure according to an exemplary embodiment of the present invention.

FIG. 9 is an NDP for sounding procedure according to an exemplary embodiment of the present invention.

FIG. 9 illustrates a NDP of a Greenfield format for reducing the overhead of the sounding protocol.

An upper part of FIG. 9 illustrates an NDP being transmitted through a 20 MHz channel band, and a lower part of FIG. 9 illustrates an NDP being transmitted through a 40 MHz channel band.

The NDP shown in FIG. 9 may not include the L-STF, L-LTF, L-SIG, and VHT-SIG-A.

In case the NDP does not include the L-STF, L-LTF, L-SIG, and VHT-SIG-A, the time resource for the NDP may be reduced by a maximum of 32 us.

In the sounding procedure, in order to use the NDP having the Greenfield format, the Bandwidth and Nsts, which correspond to information being included in the VHT-SIG-A of the NDP, which is described above in FIG. 8, may be transmitted through the NDPA.

The STA may receive the NDPA, and the STA that has received the NDPA may decide whether or not it corresponds to the target STA of the sounding procedure based on the received NDPA. In case the STA corresponds to the target STA, in order to receive the NDP that is transmitted subsequently, the STA may change the FFT size so that it can match (or fit) the transmission bandwidth of the NDP. For example, a case when the STA being the target user equipment is required to receive the NDP frame, which is shown in FIG. 9, through a 20 MHz channel bandwidth may be assumed. In this case, the STA may receive the NDPA, and the FFT may be changed from 64 FFT to 256 FFT within a SIFS time. Decoding on the NDPA, which is received based on the changed FFT, may be performed.

In case the NDP receives a NDP that is being transmitted through a 40 MHz channel bandwidth, the STA may receive the NDPA, and the FFT may be changed from 64 FFT to 512 FFT within a SIFS time.

The STA may decide the channel state information based on the received NDP. The decided channel state information may be fed-back to the STA (e.g., AP), which has requested the sounding, through a compression beam-forming report frame.

According to the exemplary embodiment of the present invention, the STA may transmit a compression beam-forming report frame as the feedback respective to the NDP, which is transmitted through a 20 MHz channel bandwidth. The compression beam-forming report frame may indicate an index respective to a sub-carrier through which a beam-forming feedback matrix is transmitted.

The sub-carrier index through which a beam-forming feedback matrix is transmitted through the 20 MHz channel bandwidth may be selected as shown below in Table 4.

TABLE 4

| Channel Width | Ng | Ns | Subcarriers for which a Beamforming Feedback Matrix subfield is sent: scidx(0), scidx(1), . . . , scidx(Ns − 1) |
|---|---|---|---|
| 20 MHz | 1 | 234 | −122, −121, −120, −119, −118, −117, −116, −115, −114, −113, −112, −111, −110, −109, −108, −107, −106, −105, −104, −102, −101, −100, −99, −98, −97, −96, −95, −94, −93, −92, −91, −90, −89, −88, −87, −86, −85, −84, −83, −82, −81, −80, −79, −78, −77, −76, −74, −73, −72, −71, −70, −69, −68, −67, −66, −65, −64, −63, −62, −61, −60, −59, −58, −57, −56, −55, −54, −53, −52, −51, −50, −49, −48, −47, −46, −45, −44, −43, −42, −41, −40, −38, −37, −36, −35, −34, −33, −32, −31, −30, −29, −28, −27, −26, −25, −24, −23, −22, −21, −20, −19, −18, −17, −16, −15, −14, −13, −12, −10, −9, −8, −7, −6, −5, −4, −3, −2, 2, 3, 4, 5, 6, 7, 8, 9, 10, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122 NOTE-Pilot subcarriers (±103, ±75, ±39, ±11) and DC subcarriers (0, ±1) are skipped. |
| | 2 | 122 | −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, −4, −2, 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122 |
| | 4 | 62 | −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, −2, 2, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122 |
| | 8 | 32 | −122, −114, −106, −98, −90, −82, −74, −66, −58, −50, −42, −34, −26, −18, −10, −2, 2, 10, 18, 26, 34, 42, 50, 58, 66, 74, 82, 90, 98, 106, 114, 122 |

Ns may indicate a total number of sub-carrier indexes through which a beam-forming feedback matrix is transmitted. Ng may indicate a difference in index between neighboring sub-carriers.

Referring to Table 4, in case Ng is equal to 1, Ns may indicate 234 sub-carriers. In case Ng is equal to 2, Ns may indicate 122 sub-carriers, and, in case Ng is equal to 4, Ns may indicate 62 sub-carriers, and, in case Ng is equal to 8, Ns may indicate 32 sub-carriers. The beam-forming feedback matrix may decide the Ns number of sub-carriers.

According to the exemplary embodiment of the present invention, the STA may transmit a compression beam-forming report frame as the feedback respective to the NDP, which is transmitted through a 40 MHz channel bandwidth. The compression beam-forming report frame may indicate an index respective to a sub-carrier through which a beam-forming feedback matrix is transmitted.

The sub-carrier index through which a beam-forming feedback matrix is transmitted through the 40 MHz channel bandwidth may be selected as shown below in Table 5.

TABLE 5

| Channel Width | Ng | Ns | Subcarriers for which a Beamforming Feedback Matrix subfield is sent: scidx(0), scidx(1), . . . , scidx(Ns − 1) |
|---|---|---|---|
| 40 MHz | 1 | 468 | −250, −249, −248, −247, −246, −245, −244, −243, −242, −241, −240, −239, −238, −237, −236, −235, −234, −233, −232, −230, −229, −228, −227, −226, −225, −224, −223, −222, −221, −220, −219, −218, −217, −216, −215, −214, −213, −212, −211, −210, −209, −208, −207, −206, −205, −204, −202, −201, −200, −199, −198, −197, −196, −195, −194, −193, −192, −191, −190, −189, −188, −187, −186, −185, −184, −183, −182, −181, −180, −179, −178, −177, −176, −175, −174, −173, −172, −171, −170, −169, −168, −166, −165, −164, −163, −162, −161, −160, −159, −158, −157, −156, −155, −154, −153, −152, −151, −150, −149, −148, −147, −146, −145, −144, −143, −142, −141, −140, −138, −137, −136, −135, −134, −133, −132, −131, −130, −126, −125, −124, −123, −122, −121, −120, −119, −118, −116, −115, −114, −113, −112, −111, −110, −109, −108, −107, −106, −105, −104, −103, −102, −101, −100, −99, −98, −97, −96, −95, −94, −93, −92, −91, −90, −88, −87, −86, −85, −84, −83, −82, −81, −80, −79, −78, −77, −76, −75, −74, −73, −72, −71, −70, −69, −68, −67, −66, −65, −64, −63, −62, −61, −60, −59, −58, −57, −56, −55, −54, −53, −52, −51, −50, −49, −48, −47, −46, −45, −44, −43, −42, −41, −40, −39, −38, −37, −36, −35, −34, −33, −32, −31, −30, −29, −28, −27, −26, −24, −23, −22, −21, −20, −19, −18, −17, −16, −15, −14, −13, −12, −11 −10, −9, −8, −7, −6, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 130, 131, 132, 133, 134, 135, 136, 137, 138, 140, 141, 142, 143, 144, 145, 146, 147, 148, 149, 150, 151, 152, 153, 154, 155, 156, 157, 158, 159, 160, 161, 162, 163, 164, 165, 166, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 204, 205, 206, 207, 208, 209, 210, 211, 212, 213, 214, 215, 216, 217, 218, 219, 220, 221, 222, 223, 224, 225, 226, 227, 228, 229, 230, 232, 233, 234, 235, 236, 237, 238, 239, 240, 241, 242, 243, 244, 245, 246, 247, 248, 249, 250 NOTE-Pilot subcarriers (±231, ±203, ±167, ±139, ±117, ±89, ±53, ±25), DC subcarriers (0, ±1, ±2, ±3, ±4, ±5) and subcarriers ±127, ±128, ±129 are skipped. |
| | 2 | 244 | −250, −248, −246, −244, −242, −240, −238, −236, −234, −232, −230, −228, −226, −224, −222, −220, −218, −216, −214, −212, −210, −208, −206, −204, −202, −200, −198, −196, −194, −192, −190, −188, −186, −184, −182, −180, −178, −176, −174, −172, −170, −168, −166, −164, −162, −160, −158, −156, −154, −152, −150, −148, −146, −144, −142, −140, −138, −136, −134, −132, −130, −126, −124, −122, −120, −118, −116, −114, −112, −110, −108, −106, −104, −102, −100, −98, −96, −94, −92, −90, −88, −86, −84, −82, −80, −78, −76, −74, −72, −70, −68, −66, −64, −62, −60, −58, −56, −54, −52, −50, −48, −46, −44, −42, −40, −38, −36, −34, −32, −30, −28, −26, −24, −22, −20, −18, −16, −14, −12, −10, −8, −6, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, 90, 92, 94, 96, 98, 100, 102, 104, 106, 108, 110, 112, 114, 116, 118, 120, 122, 124, 126, 130, 132, 134, 136, 138, 140, 142, 144, 146, 148, 150, 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214, 216, 218, 220, 222, 224, 226, 228, 230, 232, 234, 236, 238, 240, 242, 244, 246, 248, 250 NOTE-DC subcarriers 0, ±2, ±4, and ±128 are skipped. |
| | 4 | 124 | −250, −246, −242, −238, −234, −230, −226, −222, −218, −214, −210, −206, −202, −198, −194, −190, −186, −182, −178, −174, −170, −166, −162, −158, −154, −150, −146, −142, −138, −134, −130, −126, −122, −118, −114, −110, −106, −102, −98, −94, −90, −86, −82, −78, −74, −70, −66, −62, −58, −54, −50, −46, −42, −38, −34, −30, −26, −22, −18, −14, −10, −6, 6, 10, 14, 18, 22, 26, 30, 34, 38, 42, 46, 50, 54, 58, 62, 66, 70, 74, 78, 82, 86, 90, 94, 98, 102, 106, 110, 114, 118, 122, 126, 130, 134, 138, 142, 146, 150, 154, 158, 162, 166, 170, 174, 178, 182, 186, 190, 194, 198, 202, 206, 210, 214, 218, 222, 226, 230, 234, 238, 242, 246, 250 NOTE-DC subcarriers ±2 are skipped. |
| | 8 | 64 | −250, −242, −234, −226, −218, −210, −202, −194, −186, −178, −170, −162, −154, −146, −138, −130, −126, −118, −110, −102, −94, −86, −78, −70, −62, −54, −46, −38, −30, −22, −14, −6, 6, 14, 22, 30, 38, 46, 54, 62, 70, 78, 86, 94, 102, 110, 118, 126, 130, 138, 146, 154, 162, 170, 178, 186, 194, 202, 210, 218, 226, 234, 242, 250 NOTE-DC subcarriers ±2 are skipped. |

Just as in Table 4, Ns may indicate a total number of sub-carrier indexes through which a beam-forming feedback matrix is transmitted. Ng may indicate a difference in index between neighboring sub-carriers.

Referring to Table 5, in case Ng is equal to 1, Ns may indicate 468 sub-carriers. In case Ng is equal to 2, Ns may indicate 244 sub-carriers, and, in case Ng is equal to 4, Ns may indicate 124 sub-carriers, and, in case Ng is equal to 8, Ns may indicate 64 sub-carriers. The beam-forming feedback matrix may decide the Ns number of sub-carriers.

Figure 10:
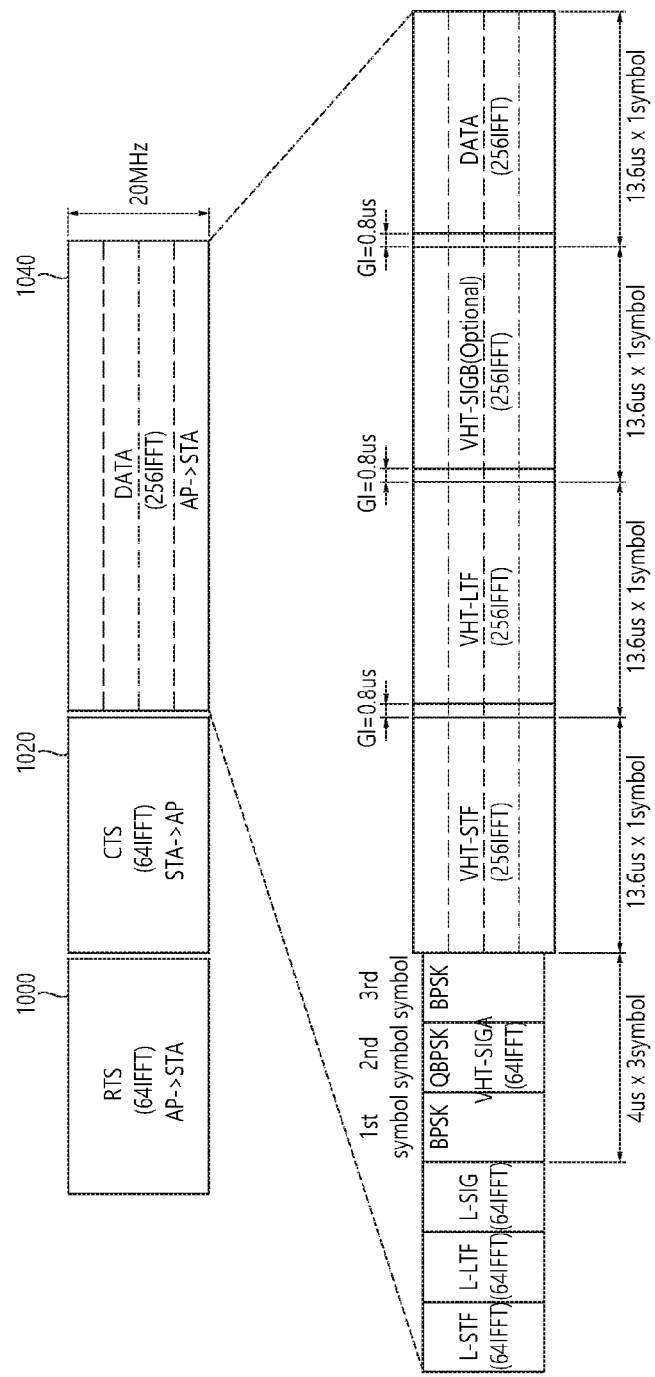
FIG. 10 is a concept view showing an exchange between frames in a VHT system according to an exemplary embodiment of the present invention.

FIG. 10 is a concept view showing an exchange between frames in a VHT system according to an exemplary embodiment of the present invention.

FIG. 10 illustrates an exchange of a RTS frame 1000, a CTS frame 1020, and a DATA frame 1040 between the AP and a STA through a 20 MHz channel band in a VHT system of 2.4 GHz. Although a case when the STA transmits the RTS frame 1000 is assumed in FIG. 10, the AP may also transmit the RTS frame 1000.

The STA may perform a back-off procedure in a 20 MHz primary channel and may gain a channel access authority. Subsequently, the STA may transmit a RTS frame 1000 including a preamble configured in a format that can be received by the legacy STAs to the AP.

The AP that has received the RTS frame 1000 may transmit a CTS frame 1020 to the STA. The STA that has received the CTS frame 1020 may transmit data to the AP through a frame 1040 having a PPDU format according to the exemplary embodiment of the present invention.

Among the fields included in the PPDU being transmitted through a 20 MHz channel band, the previous field including the VHT-SIG-A may be transmitted over an OFDM symbol that is based on 64 IFFT. Among the fields included in the PPDU, the fields following the VHT-SIG-A may be transmitted over an OFDM symbol that is based on 256 IFFT.

Figure 11:
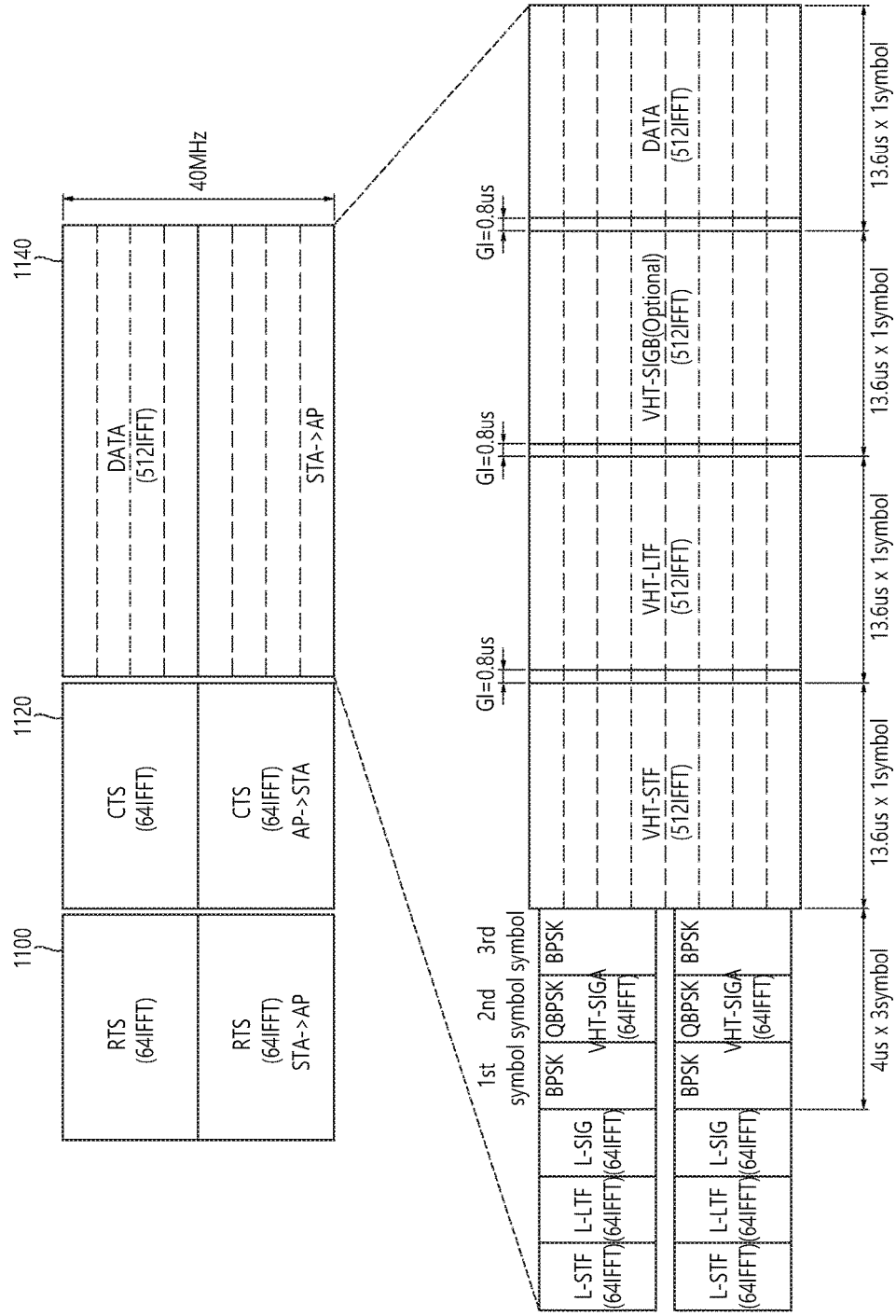
FIG. 11 is a concept view showing an exchange between frames in a VHT system according to an exemplary embodiment of the present invention.

FIG. 11 is a concept view showing an exchange between frames in a VHT system according to an exemplary embodiment of the present invention.

FIG. 11 illustrates an exchange of a RTS frame 1100, a CTS frame 1120, and a DATA frame 1140 between the AP and a STA through a 40 MHz channel band in a VHT system of 2.4 GHz. Although a case when the STA transmits the RTS frame 1100 is assumed in FIG. 11, the AP may also transmit the RTS frame 1100.

After performing a back-off procedure in a 20 MHz primary channel, the STA may gain authority on the channel access. The STA may determine whether or not it is also available for an additional 20 MHz channel band (20 MHz secondary channel). For example, the AP may verify a channel state of the secondary channel during a previous PIFS section before the back-off timer is expired. Among the channel bands of 40 MHz, excluding the 20 MHz primary channel, the secondary channel may correspond to the remaining 20 MHz secondary channel.

In order to decide whether the secondary channel is idle or busy, the STA may determine the state of the channel during a PIFS prior to a TXOP (transmission opportunity). If the secondary channel is idle during the PIFS, the STA may determine that the state of the secondary channel is idle. In FIG. 11, it will be assumed that the 20 MHz primary channel and the 20 MHz secondary channel are available for usage.

The STA may transmit a RTS frame 1100 having a duplicated PPDU (PHY protocol data unit) format through the primary channel that has performed the channel access and through each of the secondary channels that has been determined to be in the idle state. The RTS frame having the duplicated PPDU format may be configured of a duplication of the RTS frame format. The STA may transmit the RTS frame having the duplicated format at the same set-up time. The STA may transmit a RTS frame 1100 including a preamble structure having a format that can be received by all of the legacy STAs to the AP. The RTS frame 1100 may be duplicated in 20 MHz channel band units, so as to be received by all of the legacy STAs in the 40 MHz channel band, and may then be transmitted.

The AP that has received the RTS frame 1100 may respond to the STA by transmitting a CTS frame 1120 to the STA. Additionally, in order to allow the CTS frame 1120 to also be received by all of the legacy STAs, the CTS frame 1120 may also be duplicated in 20 MHz channel units (CTS frame having a duplicated format) and may then be transmitted through a 40 MHz channel bandwidth.

The STA that has received the CTS frame 1120 may transmit a data frame 1140 to the AP through a 40 MHz channel bandwidth through a PPDU according to the exemplary embodiment of the present invention.

Among the fields included in the PPDU being transmitted through a 40 MHz channel band, the previous field including the VHT-SIG-A may be transmitted over an OFDM symbol that is based on 64 IFFT. Among the fields included in the PPDU, the fields following the VHT-SIG-A may be transmitted over an OFDM symbol that is based on 512 IFFT.

Figure 12:
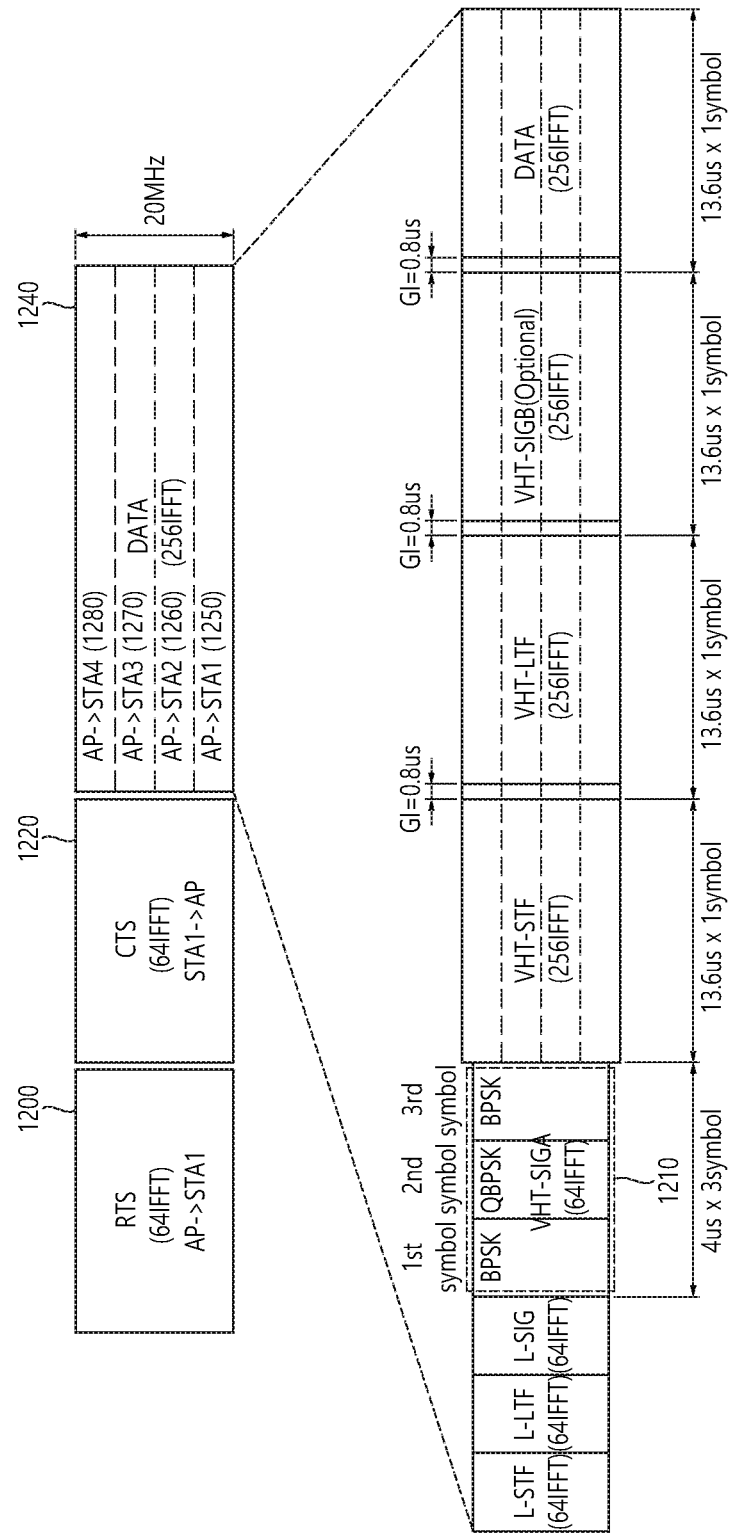
FIG. 12 is a concept view showing an exchange between frames in a VHT system according to an exemplary embodiment of the present invention.

FIG. 12 is a concept view showing an exchange between frames in a VHT system according to an exemplary embodiment of the present invention.

FIG. 12 illustrates a method of dividing a 20 MHz channel band into a plurality of sub-channels 1250, 1260, 1270, and 1280 and transmitting data to a plurality of user equipments through the divided sub-channels 1250, 1260, 1270, and 1280 in a VHT system.

In case of using not only the conventional 64 IFFT but also the 256 IFFT for the transmission of the PPDU in a 20 MHz channel band, the number of available sub-carriers for transmitting data in a frequency band may increase to 4 times.

According to the exemplary embodiment of the present invention, a 20 MHz channel band that corresponds to the 256 sub-carriers may be divided into 4 frequency resources 1250, 1260, 1270, and 1280 in units of 64 sub-carriers. In case each of the 4 sub-channels 1250, 1260, 1270, and 1280 respectively corresponding to the units of 64 sub-carriers is allocated to different STAs, each of the plurality of STAs may simultaneously perform uplink transmission and/or downlink transmission through different frequency bands 1250, 1260, 1270, and 1280.

In order to allow different frequency bands 1250, 1260, 1270, and 1280 to be allocated to each of the plurality of STAs, user assignment information respective to each sub-channel may be included in the VHT-SIG-A 1210. Each of the STAs may acquire sub-channel information respective to each of the plurality of STAs through the VHT-SIG-A 1210. For example, 6-bit group ID information may be included in the VHT-SIG-A 1210. The STA may be grouped based on group ID information, and the grouped STA may be allocated (or assigned) with a specific sub-channel. Information on the grouping of the STAs that is based on the group ID values 0 to 63 may be transmitted through another management frame.

The STA may acquire information (e.g., bandwidth of one sub-channel, number of allocated sub-channels, and so on) on the sub-channels that are allocated based on the group ID. The STA may transmit or receive a data frame 1240 through the allocated sub-channel.

If a case when the AP transmits the RTS frame 1200 and data 1240 to the STA and when the STA transmits the CTS frame 1220 is assumed, the AP and the STA may perform the following operations. The AP may gain channel access authority on the 20 MHz channel band and may then receive and transmit the RTS frame 1200 and the CTS frame 1220. More specifically, the AP may perform a back-off procedure in the 20 MHz primary channel and may then gain authority on the channel access. The AP may transmit the RTS frame 1200 to STA1, and the STA1 that has received the RTS frame 1200 may send a response to the AP by transmitting a CTS frame 1220 to the AP as a response to the RTS frame 1200.

When transmitting the data frame, the 20 MHz channel band is divided into 4 sub-channels, and each of the 4 divided sub-channels may be allocated to STA1, STA2, STA3, and STA4. The AP may simultaneously transmit different data to each of the plurality of STAs through the 4 divided sub-channels. 64 sub-carriers may be allocated for each sub-channel. Data may be transmitted to each of the STA1, STA2, STA3, and STA4 through 64 sub-carriers. In order to protect the transmission of the data, the RTS frame and the CTS frame may be transmitted through 20 MHz channel band units so as to be received by a legacy STA.

Figure 13:
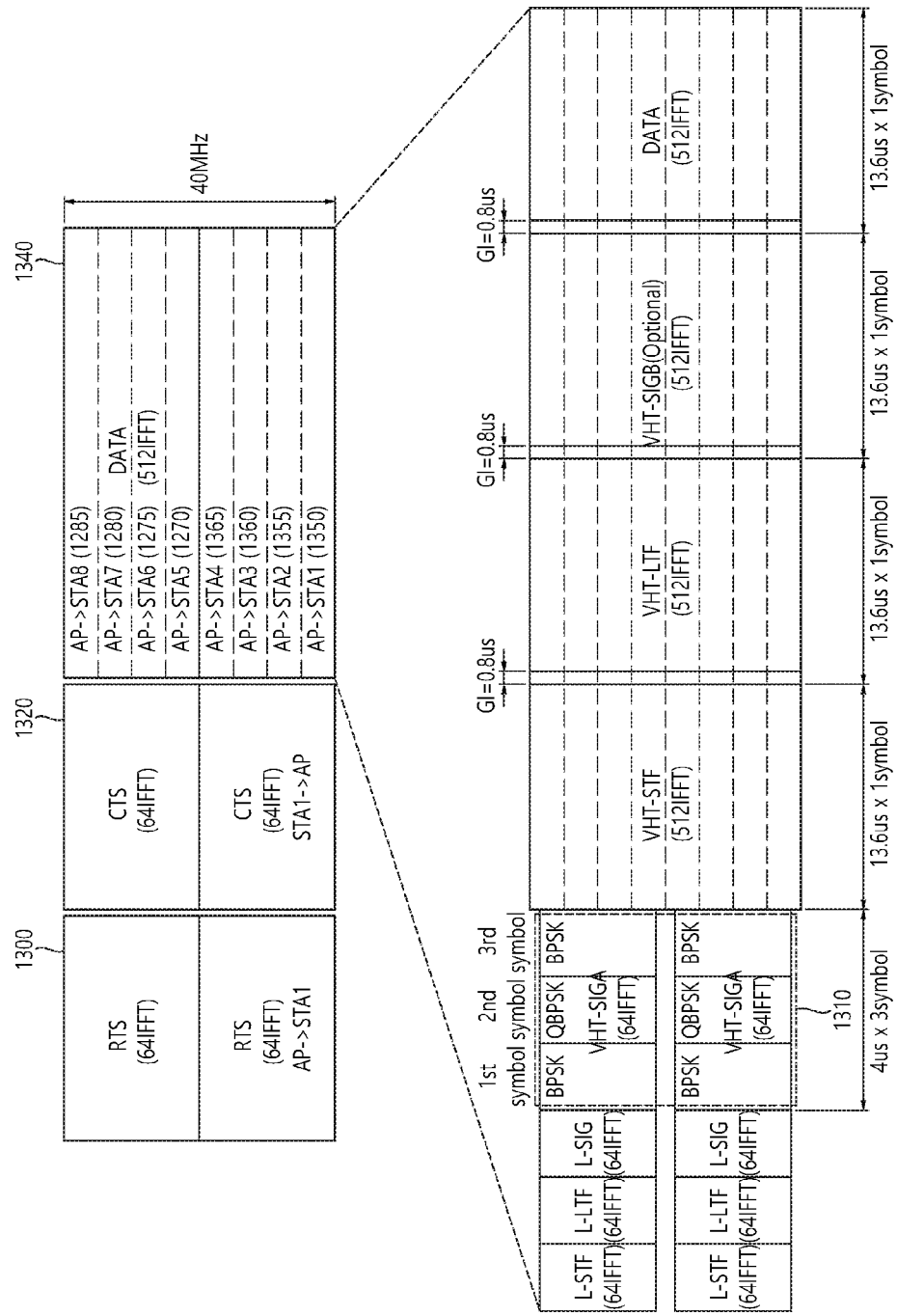
FIG. 13 is a concept view showing an exchange between frames in a VHT system according to an exemplary embodiment of the present invention.

FIG. 13 is a concept view showing an exchange between frames in a VHT system according to an exemplary embodiment of the present invention.

FIG. 13 illustrates a method of dividing a 40 MHz channel band into a plurality of sub-channels and transmitting data to a plurality of user equipments through the divided sub-channels in a VHT system.

In order to perform transmission of data, not only the conventional 64 IFFT but also the 512 IFFT may be used. In case of using the 512 IFFT, the number of available sub-carriers for transmitting data in the frequency band may be increased to 8 times as compared to the case of using 64 IFFT.

According to the exemplary embodiment of the present invention, a 40 MHz channel band that corresponds to the 512 sub-carriers may be divided into 8 frequency resources 1350 to 1385 in units of 64 sub-carriers. In case each of the 8 sub-channels 1350 to 1385 respectively corresponding to the units of 64 sub-carriers is allocated to different STAs, each of the plurality of STAs may simultaneously perform uplink transmission and/or downlink transmission through different frequency bands.

Referring to FIG. 13, each of the 8 sub-channels 1350 to 1385 may be allocated to STA1, STA2, STA3, STA4, STA5, STA6, STA7, and STA8. When simultaneously transmitting data to the plurality of STAs through each of the sub-channels 1350 to 1385, in order to protect the transmission of the data, the RTS frame 1300 and the CTS frame 1320 must be transmitted through a 40 MHz channel band that can be received by all of the legacy STAs.

The AP may gain authority on channel access by performing a back-off procedure in the 20 MHz primary channel. Additionally, the AP may verify the channel state of the secondary channel in a PIFS section before the expiration of the back-off timer and may then gain authority on the 20 MHz secondary channel.

The AP that has gained the channel access authority may transmit the RTS frame 1300 to STA1 through the 40 MHz channel band by duplicating the RTS frame 1300 in 20 MHz channel band units. Subsequently, the STA1 that has received the RTS frame 1300 may respond to the AP by transmitting a CTS frame 1320 to the AP. STA1 may transmit the CTS frame 1320 through the 40 MHz channel band by duplicating the CTS frame 1320 in 20 MHz channel band units.

When transmitting the data frame 1340, the 40 MHz channel band is divided into 8 sub-channels 1350 to 1385, and each of the 8 divided sub-channels 1350 to 1385 may be allocated to STA1, STA2, STA3, STA4, STA5, STA6, STA7, and STA8. The AP may simultaneously transmit different data to each of the plurality of STAs through the 8 divided sub-channels 1350 to 1385. 64 sub-carriers may be allocated for each sub-channel. Data may be transmitted to each of the STA1, STA2, STA3, STA4, STA5, STA6, STA7, and STA8 through 64 sub-carriers.

Figure 14:
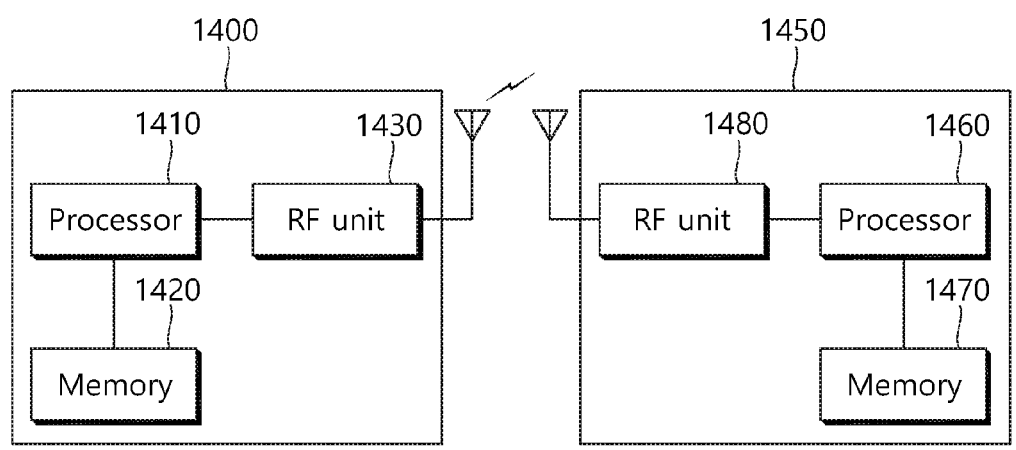
FIG. 14 is a block view showing a wireless device to which the exemplary embodiment of the present invention may be applied.

FIG. 14 is a block view showing a wireless device to which the exemplary embodiment of the present invention may be applied.

Referring to FIG. 14, as an STA that can implement the above-described exemplary embodiment, a wireless device 1400 may correspond to an AP 1450 or a non-AP station (or STA) 1400.

The STA 1400 include a processor 1410, a memory 1420, and a RF (radio frequency) unit 1430.

The RF unit 1430 may transmit/receive radio signals by being connected to the processor 1410.

The processor 1410 implements functions, processes, and/or methods of the STA that are proposed in the present invention. For example, the processor 1410 may be implemented to be capable of performing operations of the wireless device according to the exemplary embodiment of the present invention. The processor may perform operations of the STA that are disclosed in the exemplary embodiments shown in FIG. 3 to FIG. 13.

For example, the processor 1410 may be implemented to receive a NDPA frame from the AP, to receive a NDP frame based on identification information included in the NDPA frame, and to transmit channel state information, which is decided based on the NDP frame, to the AP. The processor 1410 may be implemented in order to perform demodulation on the NDPA frame based on a first FFT and to perform demodulation on the NDP frame based on a second FFT.

The AP 1450 includes a processor 1460, a memory 1470, and a RF (radio frequency) unit 1480.

The RF unit 1480 may transmit/receive radio signals by being connected to the processor 1460.

The processor 1460 implements functions, processes, and/or methods that are proposed in the present invention. For example, the processor 1420 may be implemented to be capable of performing operations of the wireless device according to the exemplary embodiment of the present invention. The processor may perform operations of the AP that are disclosed in the exemplary embodiments shown in FIG. 3 to FIG. 13.

For example, the processor 1460 may be implemented to transmit a NDPA frame over an OFDM symbol based on a first IFFT and to transmit a NDP frame over an OFDM symbol based on a second IFFT.

The processor 1410 and 1460 may include an ASIC (application-specific integrated circuit), another chip set, a logical circuit, a data processing device and/or a converter converting baseband signals and radio signals to and from one another. The memory 1420 and 1470 include a ROM (read-only memory), a RAM (random access memory), a flash memory, a memory card, a storage medium, and/or another storage device. The RF unit 1430 and 1480 may include one or more antennas transmitting and/or receiving radio signals.

When the exemplary embodiment is implemented as software, the above-described method may be implemented as a module (process, function, and so on) performing the above-described functions. The module may be stored in the memory 1420 and 1470 and may be executed by the processor 1410 and 1460. The memory 1420 and 1470 may be located inside or outside of the processor 1410 and 1460 and may be connected to the processor 1410 and 1460 through a diversity of well-known means.

What is claimed is:

1. A sounding method in a wireless LAN, the sounding method comprising:
   receiving a NDPA (null data packet announcement) frame by a STA (station) from an AP (access point);
   receiving a NDP (null data packet) frame based on identification information included in the NDPA frame by the STA; and
   transmitting channel state information being decided based on the NDP frame by the STA to the AP, and
   wherein the NDPA frame is demodulated based on a first FFT (fast fourier transform),
   wherein, if the NDP frame is demodulated based on a second FFT, after receiving the NDP frame, the STA changes a FFT within a SIFS (short inter-frame symbol) time from the first FFT to the second FFT,
   wherein the first FFT corresponds to 64 FFT, and
   wherein the second FFT corresponds to 256 FFT or 512 FFT.

2. The method of claim 1, wherein the NDPA frame includes a bandwidth field and a number of spatial streams (Nsts) field,
   wherein the bandwidth field includes information on a size of a channel band for transmitting the NDP frame, and
   wherein the Nsts field includes information on a number of spatial streams for transmitting the NDP frame.

3. The method of claim 2, wherein the channel state information includes a beam-forming feedback matrix, and
   wherein the beam-forming feedback matrix is decided based on a sub-carrier being indicated by a specific index in accordance with a size of the channel band.

4. The method of claim 1,
   wherein, if the NDP frame is demodulated based on a combination of the first FFT and the second FFT, the NDP frame includes a first field and a second field, wherein the first field is demodulated based on the first FFT, and wherein the second field is demodulated based on the second FFT.

5. The method of claim 4, wherein the first field is transmitted over 3 OFDM (orthogonal frequency division multiplexing) symbols,
   wherein the 3 OFDM symbols include a first OFDM symbol, a second OFDM symbol, and a third OFDM symbol,
   wherein a first symbol respective to the first field being received over the first OFDM symbol corresponds to a symbol being modulated based on BPSK (binary phase shifting keying),
   wherein a second symbol respective to the first field being received over the second OFDM symbol corresponds to a symbol being modulated based on QBPSK (quadrature binary phase shifting keying),
   wherein a third symbol respective to the first field being received over the third OFDM symbol corresponds to a symbol being modulated based on the BPSK, and
   wherein the third OFDM symbol corresponds to time resource for FFT transition between the first FFT and the second FFT.

6. A STA (station) performing sounding in a wireless LAN, the STA comprising:
   a RF (radio frequency) unit configured to transmit or receive radio signals; and
   a processor being operatively connected to the RF unit, wherein the processor is configured to:
   receive a NDPA (null data packet announcement) frame from an AP (access point);
   receive a NDP (null data packet) frame based on identification information included in the NDPA frame, and transmit channel state information being decided based on the NDP frame to the AP, and
   wherein the NDPA frame is demodulated based on first FFT (fast fourier transform), and
   wherein, if the NDP frame is demodulated based on a second FFT, after receiving the NDP frame, the STA changes a FFT within a SIFS (short inter-frame symbol) time from the first FFT to the second FFT,
   wherein the first FFT corresponds to 64 FFT, and
   wherein the second FFT corresponds to 256 FFT or 512 FFT.

7. The STA of claim 6, wherein the NDPA frame includes a bandwidth field and a number of spatial streams (Nsts) field,
   wherein the bandwidth field includes information on a size of a channel band for transmitting the NDP frame, and
   wherein the Nsts field includes information on a number of spatial streams for transmitting the NDP frame.

8. The STA of claim 7, wherein the channel state information includes a beam-forming feedback matrix, and
   wherein the beam-forming feedback matrix is decided based on a sub-carrier being indicated by a specific index in accordance with a size of the channel band.

9. The STA of claim 6,
   wherein, if the NDP frame is demodulated based on the first FFT and the second FFT, the NDP frame includes a first field and a second field, wherein the first field is demodulated based on the first FFT, and wherein the second field is demodulated based on the second FFT.

10. The STA of claim 9, wherein the first field is transmitted over 3 OFDM (orthogonal frequency division multiplexing) symbols,
    wherein the 3 OFDM symbols include a first OFDM symbol, a second OFDM symbol, and a third OFDM symbol,
    wherein a first symbol respective to the first field being received over the first OFDM symbol corresponds to a symbol being modulated based on BPSK (binary phase shifting keying),
    wherein a second symbol respective to the first field being received over the second OFDM symbol corresponds to a symbol being modulated based on QBPSK (quadrature binary phase shifting keying),
    wherein a third symbol respective to the first field being received over the third OFDM symbol corresponds to a symbol being modulated based on the BPSK, and
    wherein the third OFDM symbol corresponds to time resource for FFT transition between the first FFT and the second FFT.

* * * * *